US012695409B2

(12) United States Patent
Bai et al.

(10) Patent No.: US 12,695,409 B2
(45) Date of Patent: Jul. 28, 2026

(54) ENERGY STORAGE ROBOT AND ENERGY STORAGE SYSTEM

(71) Applicant: SHENZHEN HELLO TECH ENERGY CO., LTD, Shenzhen (CN)

(72) Inventors: Wei Bai, Shenzhen (CN); Zhongwei Sun, Shenzhen (CN); Tao Xu, Shenzhen (CN); Xiaowei Yin, Shenzhen (CN)

(73) Assignee: SHENZHEN HELLO TECH ENERGY CO., LTD, Shenzhen (CN)

( * ) Notice: Subject to any disclaimer, the term of this patent is extended or adjusted under 35 U.S.C. 154(b) by 187 days.

(21) Appl. No.: 18/633,557

(22) Filed: Apr. 12, 2024

(65) Prior Publication Data

US 2024/0421750 A1     Dec. 19, 2024

Related U.S. Application Data

(63) Continuation of application No. PCT/CN2023/138211, filed on Dec. 12, 2023.

(30) Foreign Application Priority Data

Jun. 13, 2023    (CN) .......................... 202310698306.8
Jun. 13, 2023    (CN) .......................... 202310698307.2
(Continued)

(51) Int. Cl.
*H02J 7/00*          (2026.01)
*B60L 53/30*        (2019.01)
(Continued)

(52) U.S. Cl.
CPC ............. *H02S 10/40* (2014.12); *B60L 53/30* (2019.02); *H02J 7/35* (2013.01); *H02J 7/485* (2026.01);
(Continued)

(58) Field of Classification Search
CPC ..... H02J 7/35; H02J 7/485; H02J 7/70; B60L 53/30; H02S 10/40; H02S 30/20; H02S 40/38; H02S 20/32
(Continued)

(56) References Cited

U.S. PATENT DOCUMENTS

| 2011/0193513 A1 | 8/2011 | Wagnon et al. |
| 2023/0142826 A1 | 5/2023 | Kuss |
| 2023/0158893 A1* | 5/2023 | Lin ......................... B60L 8/003 |
| | | 320/104 |

FOREIGN PATENT DOCUMENTS

| CN | 203336450 U | 12/2013 |
| CN | 103944202 A | * 7/2014 |

(Continued)

OTHER PUBLICATIONS

Partial European Search Report from corresponding European Application No. EP23871086.4, dated Jan. 8, 2025.
(Continued)

*Primary Examiner* — Zixuan Zhou

(57) ABSTRACT

Provided are an energy storage robot and an energy storage system. The energy storage robot includes a base, a support, and a plurality of sensors. The base is provided with a battery therein and a moving device at a bottom of the base. The moving device is configured to drive the base to move relative to the ground. The support is detachably connected to the base. The support is provided with a plurality of solar panels. The plurality of solar panels is electrically connected to the battery. The plurality of sensors is disposed at the base and/or the support and configured to detect a movement range and/or environmental information of the base. A light receiving area of the plurality of solar panels in a first state is smaller than a light receiving area of the plurality of solar panels in a second state.

8 Claims, 8 Drawing Sheets

(30) Foreign Application Priority Data

| Jun. 13, 2023 | (CN) | .......................... | 202310698309.1 |
|---|---|---|---|
| Jun. 13, 2023 | (CN) | .......................... | 202310698310.4 |
| Jun. 13, 2023 | (CN) | .......................... | 202310698311.9 |
| Jun. 13, 2023 | (CN) | .......................... | 202310698312.3 |
| Jun. 13, 2023 | (CN) | .......................... | 202310698314.2 |
| Jun. 13, 2023 | (CN) | .......................... | 202321502840.9 |
| Jun. 13, 2023 | (CN) | .......................... | 202321502841.3 |
| Jun. 13, 2023 | (CN) | .......................... | 202321502842.8 |

(51) Int. Cl.

| *H02J 7/35* | (2006.01) |
|---|---|
| *H02J 7/70* | (2026.01) |
| *H02S 10/40* | (2014.01) |
| *H02S 20/32* | (2014.01) |
| *H02S 30/20* | (2014.01) |
| *H02S 40/38* | (2014.01) |

(52) U.S. Cl.
CPC ................ *H02J 7/70* (2026.01); *H02S 20/32* (2014.12); *H02S 30/20* (2014.12); *H02S 40/38* (2014.12)

(58) Field of Classification Search
USPC ................................................. 320/101, 137
See application file for complete search history.

(56) References Cited

FOREIGN PATENT DOCUMENTS

| CN | 104973150 | A |   | 10/2015 |  |  |
|---|---|---|---|---|---|---|
| CN | 206287147 | U | * | 6/2017 |  |  |
| CN | 206574415 | U |   | 10/2017 |  |  |
| CN | 107834616 | A |   | 3/2018 |  |  |
| CN | 108008722 | A |   | 5/2018 |  |  |
| CN | 108039780 | A |   | 5/2018 |  |  |
| CN | 108177535 | A |   | 6/2018 |  |  |
| CN | 110011393 | A |   | 7/2019 |  |  |
| CN | 110593353 | A |   | 12/2019 |  |  |
| CN | 110995134 | A |   | 4/2020 |  |  |
| CN | 210871329 | U |   | 6/2020 |  |  |
| CN | 111660824 | A |   | 9/2020 |  |  |
| CN | 211480971 | U |   | 9/2020 |  |  |
| CN | 112271498 | A |   | 1/2021 |  |  |
| CN | 112702008 | A |   | 4/2021 |  |  |
| CN | 112821519 | A |   | 5/2021 |  |  |
| CN | 113359712 | A | * | 9/2021 | ........... | G05D 1/0251 |
| CN | 114683899 | A |   | 7/2022 |  |  |
| CN | 218040897 | U |   | 12/2022 |  |  |
| CN | 218698992 | U |   | 3/2023 |  |  |
| CN | 116232206 | A |   | 6/2023 |  |  |
| CN | 219115274 | U |   | 6/2023 |  |  |
| CN | 116436168 | A |   | 7/2023 |  |  |
| CN | 116494268 | A |   | 7/2023 |  |  |
| CN | 116551717 | A |   | 8/2023 |  |  |
| CN | 116638531 | A |   | 8/2023 |  |  |
| CN | 116722660 | A |   | 9/2023 |  |  |
| CN | 116728428 | A |   | 9/2023 |  |  |
| CN | 116787461 | A |   | 9/2023 |  |  |
| CN | 220762637 | U |   | 4/2024 |  |  |
| JP | 2005101103 | A |   | 4/2005 |  |  |
| JP | 2011243934 | A |   | 12/2011 |  |  |
| JP | 2021195040 | A |   | 12/2021 |  |  |
| KR | 20090121063 | A |   | 11/2009 |  |  |
| KR | 20180125698 | A |   | 11/2018 |  |  |
| KR | 20190089640 | A |   | 7/2019 |  |  |
| KR | 20210003527 | A |   | 1/2021 |  |  |
| KR | 20220059603 | A |   | 5/2022 |  |  |
| WO | 2019051553 | A1 |   | 3/2019 |  |  |
| WO | 2022017213 | A1 |   | 1/2022 |  |  |
| WO | 2022246901 | A1 |   | 12/2022 |  |  |

OTHER PUBLICATIONS

First Office Action dated Mar. 12, 2025 received in corresponding patent family application No. CN202310698306.8. English translation attached.

Second Office Action dated Mar. 22, 2025 received in corresponding patent family application No. CN202310698306.8. English translation attached.

First Office Action dated Mar. 11, 2025 received in corresponding patent family application No. CN202310698309.1. English translation attached.

First Office Action dated Mar. 11, 2025 received in corresponding patent family application No. CN202310698310.4. English translation attached.

Second Office Action dated Mar. 22, 2025 received in corresponding patent family application No. CN202310698310.4. English translation attached.

International Search Report dated Mar. 15, 2024 in International Application No. PCT/CN2023/138211.

The First Office Action from corresponding Chinese Application No. 202310698312.3, dated Jul. 21, 2023. English translation attached.

The Second Office Action from corresponding Chinese Application No. 202310698312.3, dated Aug. 3, 2023. English translation attached.

The Grant Notice from corresponding Chinese Application No. 202310698312.3, dated Aug. 24, 2023. English translation attached.

The First Office Action from corresponding Chinese Application No. 202310698314.2, dated Jul. 29, 2023. English translation attached.

The Second Office Action from corresponding Chinese Application No. 202310698314.2, dated Aug. 9, 2023. English translation attached.

The Rejection Decision from corresponding Chinese Application No. 202310698314.2, dated Aug. 30, 2023. English translation attached.

The Supplementary Search Report from corresponding Chinese Application No. 202310698312.3, dated Aug. 22, 2023.

Rejection Decision dated Apr. 11, 2025 received in corresponding patent family application No. CN202310698306.8. English translation attached.

First Office Action dated May 7, 2025 received in corresponding patent family application No. CN202310698307.2. English translation attached.

Rejection Decision dated Jun. 30, 2025 received in corresponding patent family application No. CN202310698307.2. English translation attached.

Second Office Action dated May 30, 2025 received in corresponding patent family application No. CN202310698307.2. English translation attached.

Rejection Decision dated Apr. 17, 2025 received in corresponding patent family application No. CN202310698309.1. English translation attached.

Second Office Action dated Mar. 31, 2025 received in corresponding patent family application No. CN202310698309.1. English translation attached.

Rejection Decision dated Apr. 11, 2025 received in corresponding patent family application No. CN202310698310.4. English translation attached.

Extended European Search Report dated Apr. 28, 2025 received in corresponding European Application No. EP23874086.4.

Notice of Reasons for Rejection dated Jun. 3, 2025 received in corresponding patent family application No. JP2024522417. English translation attached.

Grant Notice dated Oct. 30, 2023 received in corresponding patent family application No. CN202321502841.3. English translation attached.

Grant Notice dated Oct. 30, 2023 received in corresponding patent family application No. CN202321502842.8. English translation attached.

Written Opinion dated Mar. 15, 2024 in International Application No. PCT/CN2023/138211. English translation attached.

(56)         References Cited

OTHER PUBLICATIONS

Grant Notice dated Jan. 4, 2024 received in corresponding patent family application No. CN202321502840.9. English translation attached.

\* cited by examiner

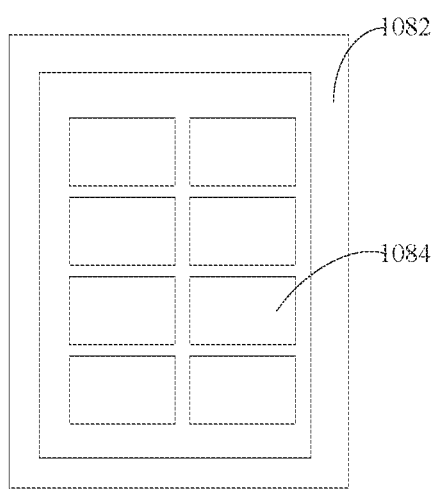
FIG. 3
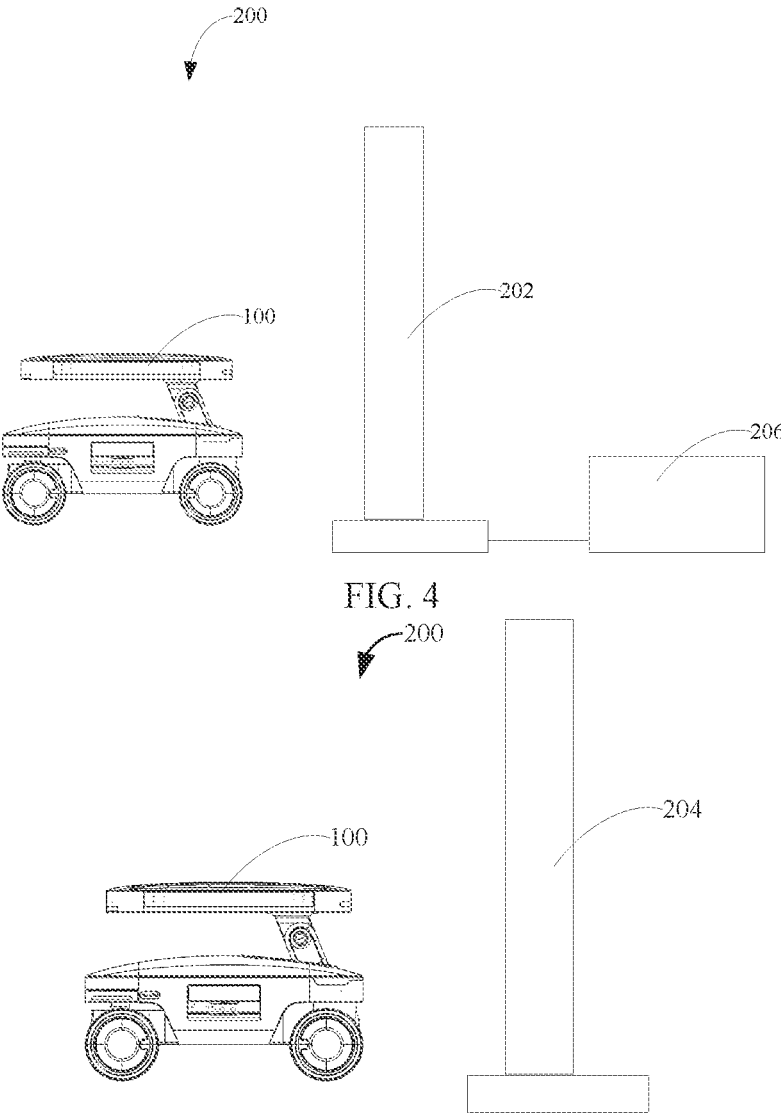
FIG. 4
FIG. 5

1

ENERGY STORAGE ROBOT AND ENERGY STORAGE SYSTEM

CROSS-REFERENCE TO RELATED APPLICATION

This application is a continuation of International Application No. PCT/CN2023/138211, filed on Dec. 12, 2023, which claims priorities to Chinese Patent Application No. 202310698310.4, No. 202310698309.1, No. 202310698314.2, No. 202310698312.3, No. 202310698311.9, No. 202310698306.8, No. 202321502840.9, No. 202321502842.8, No. 202321502841.3, and No. 202310698307.2, all of which are filed on Jun. 13, 2023, all of which are hereby incorporated by reference in their entireties.

FIELD

The present disclosure relates to the technical field of electric energy storage, and in particular, to an energy storage robot and an energy storage system.

BACKGROUND

At present, in an outdoor scene, a user usually opts for outdoor power sources when needing to use power. In a case where the user has high power requirements, a weight of existing outdoor power sources increases with an increase in reserve of power. When an outdoor power source needs to be used for a long time, solar energy is usually used for energy charging. Energy charging efficiency is related to an area of the solar panel. When the area of the solar panel is excessively large, portability and charging efficiency cannot be well balanced. In addition, when there is a demand for multi-point power consumption, it is laborious to carry the outdoor power supply.

SUMMARY

The present disclosure aims to at least solve one of the technical problems existing in the prior art or related art.

In view of this, an embodiment of a first aspect of the present disclosure provides an energy storage robot.

An embodiment of a second aspect of the present disclosure provides an energy storage system.

In order to achieve the above objects, an embodiment of the first aspect of the present disclosure provides an energy storage robot, including a base, a support, and a plurality of sensors. The base is provided with a battery therein and a moving device at a bottom of the base. The moving device is configured to drive the base to move relative to the ground. The support is detachably connected to the base. The support is provided with a plurality of solar panels. The plurality of solar panels is electrically connected to the battery. The plurality of sensors is disposed at the base and/or the support and configured to detect a movement range and/or environmental information of the base. A light receiving area of the plurality of solar panels in a first state is smaller than a light receiving area of the plurality of solar panels in a second state.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that mobile power supply within a predetermined region range is achieved. It can be understood that in an outdoor scene, power demand at different places exists at different time points. At this time, the battery is driven by the moving device to move to different positions, which greatly improves a use convenience degree of the user and improves a usage experience of the user. In addition, the detachably connected support is further disposed at the base. By providing the solar panel at the support, in a case where outdoor sunlight is strong and power generation efficiency is high, energy of the battery can be supplemented through the solar panel, thereby ensuring longer-time use. In this solution, at least one of the base and the support is further provided with a sensor in their structure, which can obtain and determine the surrounding environment and the corresponding movement range of the energy storage robot. In this way, movement control of the base, movement control of the solar panel, and even detection of the weather condition can be realized, thereby greatly improving the intelligence of the energy storage robot during use. The energy storage robot can be used as an ideal tool during user's actual use, to improve user's usage experience.

It needs to be emphasized that, in the solution, the solar panel located at the support is movable and has different states. In the first state, the light receiving area of the plurality of solar panels is small, which belongs to a storage state. Moreover, there is only one solar panel or no solar panel to receive light for charging the battery. In the second state, the light receiving area of the plurality of solar panels is large, which belongs to the expanded state. At this time, the solar panel is applied to a scene where sunlight is strong and high power is required for charging the battery.

It can be understood that a connection between the solar panel and the battery is an electrical connection. In some embodiments, a charging controller needs to be used for a connection between the solar panel and the battery. During a specific connection, a positive electrode and a negative electrode of the solar panel need to be connected to a positive electrode and a negative electrode of the charging controller, respectively. Then, a positive electrode and a negative electrode of the battery are connected to the positive electrode and the negative electrode of the charging controller, respectively.

Further, the energy storage robot can move as a whole. Moreover, a position of the support relative to the base is adjustable. In this way, an angle of the solar panel is changeable. In addition, portability and the power generation efficiency are balanced, and photoelectric conversion efficiency is improved.

Further, a connection between the support and the base is a detachable connection, and specifically includes, but is not limited to, a magnetic connection, a snap connection, and the like, as long as the connection between the two are facilitated.

An embodiment of the second aspect of the present disclosure provides an energy storage system, including a charging pile and the energy storage robot according to any one of items in the first aspect. The charging pile charges the energy storage robot in response to the energy storage robot moving to a charging position of the charging pile.

According to the energy storage system provided by the present disclosure, the energy storage system includes the charging pile and the energy storage robot. The charging pile may correspondingly have a chargeable range, i.e., the charging position. The charging pile charges the energy storage robot in response to the energy storage robot moving to the charging position of the charging pile. At this time, the current is transferred to the battery of the energy storage robot from the charging pile, facilitating subsequent use.

In other embodiments of the present disclosure, since the energy storage system includes the energy storage robot according to any one of the above technical solutions, the energy storage system has any one of the technical effects of the solution of the energy storage robot as described above, and details are omitted herein.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, electricity can be transferred by the energy storage robot to the electricity storage pile, and then is finally transferred into the energy storage device through a connection between the electricity storage pile and the energy storage device, so as to facilitate use of household electric device.

In one scene, the energy storage robot may be continuously charged in the daytime. The energy storage robot may automatically move to the electricity storage position for charging the energy storage device after its built-in battery is fully charged, and then go to the outdoor to absorb solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In order to achieve the above objects, an embodiment of the first aspect of the present disclosure provides an energy storage robot, including a base, a support, a storage box, and a plurality of sensors. The base is provided with a battery therein and a moving device at a bottom of the base. The moving device is configured to drive the base to move relative to the ground. The support is detachably connected to the base. The storage box is movably connected to the support and provided with a plurality of solar panels. The plurality of solar panels is movable and electrically connected to the battery. The plurality of sensors is disposed at the base and/or the support and configured to detect a movement range and/or environmental information of the base. The plurality of solar panels has a storage state and an expanded state. In the storage state, the plurality of solar panels are stacked and stored in the storage box, and in the expanded state, the plurality of solar panels extends outwards from the storage box.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

It can be understood that, in this solution, the plurality of movable solar panels is disposed in the storage box, and can be expanded or stored according to actual requirements. In the expanded state, the solar panel extends outwards, so that a lighting area is increased, and charging efficiency is improved; and in the storage state, the solar panel is stacked and stored in the storage box, which saves a space and is convenient to be carried and transported.

By providing the storage box at the support, a predetermined storage space can be provided for the plurality of solar panels, enabling the plurality of solar panels in the storage state to be stored in the storage box. Therefore, a storage space of the solar panel is greatly reduced, and the portability is improved. In the expanded state, the plurality of solar panels extends out of the storage box, allowing the light receiving area corresponding to the plurality of solar panels to be increased. Therefore, the power generation efficiency is improved.

It needs to be emphasized that, in the solution, the solar panel located at the support is movable and has different states. In the storage state, the light receiving area of the plurality of solar panels is small, which belongs to the storage state. Moreover, there is only one solar panel or no solar panel to receive light for charging the battery. In the expanded state, the light receiving area of the plurality of solar panels is large, which belongs to the expanded state, and at this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of the second aspect of the present disclosure provides an energy storage system, including a charging pile and the energy storage robot according to any one of items in the first aspect. The charging pile charges the energy storage robot in response to the energy storage robot moving to the charging position of the charging pile.

According to the energy storage system provided by the present disclosure, the energy storage system includes the charging pile and the energy storage robot. The charging pile may correspondingly have a chargeable range, i.e., the charging position. The charging pile charges the energy storage robot in response to the energy storage robot moving to the charging position of the charging pile. At this time, the current is transferred to the battery of the energy storage robot from the charging pile, facilitating subsequent use.

In other embodiments of the present disclosure, since the energy storage system includes the energy storage robot according to any one of the above technical solutions, the energy storage system has any one of the technical effects of the solution of the energy storage robot as described above, and details are omitted herein.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In order to achieve the above objects, an embodiment of the first aspect of the present disclosure provides an energy storage robot, including a base, a support, and a plurality of sensors. The base is provided with a battery therein and a moving device at a bottom of the base. The moving device is configured to drive the base to move relative to the ground. The support is detachably connected to the base. The support is provided with a plurality of solar panels electrically connected to the battery. The plurality of sensors is disposed at the base and/or the support and configured to detect a movement range and/or environmental information of the base. A part of the plurality of solar panels are disposed at a side of the support facing towards the base, and another part of the plurality of solar panels are disposed at a side of the support away from the base, and a light receiving area of the plurality of solar panels in a first state is smaller than a light receiving area of the plurality of solar panels in a second state.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longertime use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

For the solar panel, an arrangement position of the solar panel is related to an orientation. In this solution, a part of the solar panels is provided at a top side of the support, and another part of the solar panels is provided at a bottom side of the support. Solar energy at some special angles can be received through the solar panels at the two sides of the support, such that a scene where the energy storage robot absorbs solar energy can be improved, widening an application range of the product.

The solar panel located at a side of the support facing towards the base cannot directly receive the solar energy and can only perform absorption through reflections of other structures. However, compared with the solar panel only provided at the top side, the power generation efficiency of the energy storage robot under the same condition is superposition of power generation efficiency of a front solar panel and power generation efficiency of a back solar panel, and the power generation efficiency is greater.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of the second aspect of the present disclosure provides an energy storage system, including a charging pile and the energy storage robot according to any one of items in the first aspect. The charging pile charges the energy storage robot in response to the energy storage robot moving to the charging position of the charging pile.

According to the energy storage system provided by the present disclosure, the energy storage system includes the charging pile and the energy storage robot. The charging pile may correspondingly have a chargeable range, i.e., the charging position. The charging pile charges the energy storage robot in response to the energy storage robot moving to the charging position of the charging pile. At this time, the current is transferred to the battery of the energy storage robot from the charging pile, facilitating subsequent use.

In other embodiments of the present disclosure, since the energy storage system includes the energy storage robot according to any one of the above technical solutions, the energy storage system has any one of the technical effects of the solution of the energy storage robot as described above, and details are omitted herein.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In order to achieve the above objects, an embodiment of the first aspect of the present disclosure provides an energy storage robot, including a base, a support, a plurality of sensors, and a controller. The base is provided with a battery therein and a moving device at a bottom of the base. The moving device is configured to drive the base to move relative to the ground. The support is detachably connected to the base. The support is provided with a plurality of solar panels electrically connected to the battery. The plurality of sensors is disposed at the base and/or the support and configured to detect a movement range and/or environmental information of the base. The controller is electrically connected to the plurality of sensors and the moving device. The controller is configured to control a movement of at least one of the plurality of solar panels based on the environmental information detected by the plurality of sensors. A light receiving area of the plurality of solar panels in a first state is smaller than a light receiving area of the plurality of solar panels in a second state.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

By providing the controller, the movement of the at least one of solar panels can be controlled according to the environmental information determined by the sensor, enabling the controller to receive a maximum illumination intensity, improving the power generation efficiency. In some embodiments, the sensor may monitor the environmental information in real time, such as an illumination intensity, a light direction, a temperature, and the like. Then, the controller is electrically connected to the sensor and the moving device. The movement of the solar panel is controlled according to the environmental information determined by the sensor. This may include adjusting an angle of the solar panel and/or a position of the base, enabling the solar panel to be always kept at an optimal angle and position for receiving the illumination, thereby making comprehensive power generation efficiency reach the maximum. Therefore, intelligent control is achieved, and stability and reliability of the system are improved.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In order to achieve the above objects, an embodiment of the first aspect of the present disclosure provides an energy storage robot, including a base, a support, a plurality of sensors, and a controller. The base is provided with a battery therein and a moving device at a bottom of the base. The moving device is configured to drive the base to move relative to the ground. The support is detachably connected to the base. The support is provided with a plurality of solar panels electrically connected to the battery. The plurality of sensors is disposed at the base and/or the support. The plurality of sensors is configured to detect position information of an obstacle within at least one range. The controller is electrically connected to the plurality of sensors and the moving device. A light receiving area of the plurality of solar panels in a first state is smaller than a light receiving area of the plurality of solar panels in a second state. The controller determines, in response to the plurality of solar panels being in the second state, a movement range of the moving device based on the position information. The plurality of solar panels is not in contact with the obstacle at any position within the movement range.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

The position information of the obstacle is detected by using the plurality of sensors, to ensure that no collision of the solar panel with the obstacle occurs during the movement of the solar panel. In addition, the system can also automatically adjust the position of the solar panel according to a difference between the light receiving area of the solar panel in the first state and the light receiving area of the solar panel in the second state, allowing the solar panel to receive the maximum illumination intensity, thereby improving the power generation efficiency.

When the solar panel is in the second state, the controller may determine the movement range of the moving device according to the position information of the obstacle detected by the sensor. The controller controls the moving device to move to other positions within the movement range, so that the solar panel is not in contact with the obstacle, thereby realizing intelligent obstacle avoidance during movement. By using the plurality of sensors to detect the position information of the obstacle, the controller may automatically adjust the movement position of the solar panel to avoid the occurrence of collision, thereby improving the stability and reliability of the system. Meanwhile, the system may also automatically adjust the position of the solar panel according to a difference between the light receiving areas of the solar panel in different states, to improve the power generation efficiency.

It needs to be supplemented that the energy storage robot of the solution has a sentinel mode to monitor surrounding objects. In a case where the solar panel is expanded, when a trolley moves, or the solar panel is controlled to adjust its orientation, it will be monitored that whether there is an obstacle likely to have a collision around the robot ceaselessly. In response to the occurrence of the obstacle likely to have the collision around the robot, the trolley or the solar panel is controlled to avoid the obstacle.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of the second aspect of the present disclosure provides an energy storage system, including a charging pile and the energy storage robot according to any one of items in the first aspect. The charging pile charges the energy storage robot in response to the energy storage robot moving to the charging position of the charging pile.

According to the energy storage system provided by the present disclosure, the energy storage system includes the charging pile and the energy storage robot. The charging pile may correspondingly have a chargeable range, i.e., the charging position. The charging pile charges the energy storage robot in response to the energy storage robot moving to the charging position of the charging pile. At this time, the current is transferred to the battery of the energy storage robot from the charging pile, facilitating subsequent use.

In other embodiments of the present disclosure, since the energy storage system includes the energy storage robot according to any one of the above technical solutions, the energy storage system has any one of the technical effects of the solution of the energy storage robot as described above, and details are omitted herein.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In order to achieve the above objects, an embodiment of the first aspect of the present disclosure provides an energy storage robot, including a base, a support, a plurality of sensors, and a controller. The base is provided with a battery therein and a moving device at a bottom of the base. The moving device is configured to drive the base to move relative to the ground. The support is detachably connected to the base. The support is provided with a plurality of solar panels electrically connected to the battery. The plurality of solar panels is rotatable relative to the support to adjust an incident angle of light. The plurality of sensors is disposed at the base and/or the support and configured to detect a movement range and/or environmental information of the base. The controller is electrically connected to the plurality of sensors, the plurality of solar panels, and the moving device. The controller is configured to: determine, based on the illumination information, position information and angle information which are corresponding to optimal photovoltaic conversion efficiency; control, based on the position information, the moving device to move, and control, based on the angle information, the plurality of solar panels to rotate relative to the support. The plurality of solar panels has a light receiving area in a first state smaller than a light receiving area of the plurality of solar panels in a second state.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

In this solution, in a power generation mode, the sensor detects outdoor sunlight at any time, and determines an optimal power generation position in a predetermined region and an optimal power generation angle of the solar panel through a specific algorithm. In some embodiments, each of the base and the support is provided with a plurality of sensors for determining the movement range and the illumination information of the base, enabling the robot to be adaptively adjusted according to real-time environmental information. The solar panel is rotatable relative to the support to adjust the incident angle of light. In this way, the solar panel is always kept under an optimal illumination condition, improving the photovoltaic conversion efficiency. Further, by intelligently controlling the position and angle of the solar panel and the movement of the base, the robot can achieve the optimal photovoltaic conversion efficiency in different environments, thereby improving an energy utilization rate and lowering energy consumption.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In view of this, the present disclosure provides an energy storage system.

In order to achieve the above objects, the technical solutions of the present disclosure provide an energy storage system, including at least one electric pile device, and an energy storage robot. Each of the at least one electric pile device has a first charging port defined thereon. The energy storage robot includes a base, a support, a second charging port, a plurality of sensors, and a controller. The base is provided with a battery therein and a moving device at a bottom of the base. The moving device is configured to drive the base to move relative to the ground. The support is detachably connected to the base. The support is provided with a plurality of solar panels electrically connected to the battery. A light receiving area of the plurality of solar panels in a first state is smaller than a light receiving area of the plurality of solar panels in a second state. The second charging port is movably connected to the base. A height of the second charging port relative to the base is adjustable. The plurality of sensors is disposed at the base and/or the support and configured to detect a movement range and/or environmental information of the base. The controller is disposed at the electric pile device and/or the energy storage robot. The controller is configured to control, in response to the base moving into a charging range of the electric pile device, the second charging port to lift and lower to allow the second charging port to be connected to the first charging port.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

The solution mainly includes an electric pile device and an energy storage robot. The electric pile device has a first charging port defined thereon. The energy storage robot has a second charging port defined thereon, and a position of the second charging port is mobilizable. The electric pile device provides a charging interface for the energy storage robot to be connected and charged. For the energy storage robot, after the energy storage robot moves to the charging range, the second charging port automatically adjusts its height, so that the second charging port is connected to the first charging port. It can be understood that when the plurality of electric pile devices is provided and can be used for charging the energy storage robot, since a difference may occur in height positions of the different electric pile devices, when the robot is matched with different charging piles, adjustments of the robot position in a vertical direction are performed.

It needs to be supplemented that, in this solution, the energy storage robot may automatically find and connect to the electric pile device according to data of the sensor, to realize automatic charging and improve charging efficiency and convenience.

Further, except for solar energy charging, the energy storage robot may support other charging modes, for example, using the electric pile device to perform alternating current charging, wireless charging, and the like, so as to meet different requirements of users.

In addition, the energy storage robot may automatically schedule a charging task according to information like the rest of electric quantity of the battery and charging requirements, thereby improving the charging efficiency.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

In view of this, the present disclosure provides an energy storage system.

In order to achieve the above objects, the technical solutions of the present disclosure provide an energy storage system, including at least one electric pile device, and an energy storage robot. The at least one electric pile device is electrically connected to a mains supply. The energy storage robot includes abase, a plurality of sensors, an electric quantity, and a controller. The base is provided with a battery therein and a moving device at a bottom of the base. The moving device is configured to drive the base to move relative to the ground. The plurality of sensors is disposed at the base and/or the support. The plurality of sensors is configured to detect a movement range and/or environmental information of the base. The electric quantity detection module is disposed at the base, and configured to detect the rest of electric quantity of the battery. The controller is disposed at the electric pile device and/or the energy storage robot. The controller supplies, in response to the energy storage robot moving into a powered-on range of the electric pile device and the mains supply connected to the electric pile device being powered off, power to an electric device connected to the mains supply by using the battery.

According to the energy storage system provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user.

In this solution, by providing the electric quantity detection module, a capacity of a built-in battery of the base can be detected, i.e., the rest of electric quantity of the battery is determined, and a corresponding electric quantity interaction strategy can be determined according to the rest of electric quantity. In some embodiments, when the mains supply is powered off, the controller can automatically switch to supply power by using the battery of the energy storage robot, which can supply power to the home by using the battery power to ensure normal operation of the electric device connected to the mains supply. When the robot is out of power, power supplied to the energy storage robot can be poered through household electricity.

It needs to be supplemented that, in this solution, the energy storage robot may automatically find and connect to the electric pile device according to the data of the sensor, to realize the automatic charging and improve the charging efficiency and convenience.

In view of this, an embodiment of the first aspect of the present disclosure provides an energy storage robot An embodiment of the second aspect of the present disclosure provides an energy storage system.

In order to achieve the above objects, an embodiment of the first aspect of the present disclosure provides an energy storage robot, including a base, a support, a plurality of charging interfaces, a plurality of sensors, and a controller. The base is provided with a battery therein and a moving device at a bottom of the base. The moving device is configured to drive the base to move relative to the ground. The support is detachably connected to the base. The support is provided with a plurality of solar panels electrically connected to the battery. A light receiving area of the plurality of solar panels in a first state is smaller than a light receiving area of the plurality of solar panels in a second state. The plurality of charging interfaces is disposed on at least one wall surface of the base. At least two of the plurality of charging interfaces are of different charging specifications. The plurality of sensors is disposed at the base and/or the support and configured to detect an interface type present within a detection range of the plurality of charging interfaces. The controller is electrically connected to the plurality of charging interfaces and the plurality of sensors. The controller is configured to control, based on the interface type detected by the plurality of sensors, a corresponding charging interface of the plurality of charging interfaces to be connected to the battery and the rest of the plurality of charging interfaces to be disconnected from the battery.

According to the energy storage robot provided by the present disclosure, the energy storage robot mainly includes the base, the support, the charging interface, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

By providing the plurality of charging interfaces, the charging requirements of the energy storage robots of different specifications and models can be satisfied, to improve universality and compatibility of the device. When a predetermined type of device needs to be charged, only a circuit of a corresponding charging interface is turned on, i.e., only the corresponding charging interface is controlled to be in communication with the battery, such that power supply can be achieved through the charging interface, and the rest of charging interfaces are not powered on, avoiding safety hazards such as short circuit and overcurrent. It can be understood that the sensor can detect the interface type, and the controller automatically selects the corresponding charging interface according to the interface type detected by the sensor, thereby simplifying the charging process and improving the charging efficiency. In an actual use process, the user can replace the charging interfaces of different specifications at any time as required, thereby improving the user's usage experience.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of the second aspect of the present disclosure provides an energy storage system, including a charging pile and the energy storage robot according to any one of items in the first aspect. The charging pile charges the energy storage robot in response to the energy storage robot moving to the charging position of the charging pile.

According to the energy storage system provided by the present disclosure, the energy storage system includes the charging pile and the energy storage robot. The charging pile may correspondingly have a chargeable range, i.e., the charging position. The charging pile charges the energy storage robot in response to the energy storage robot moving to the charging position of the charging pile. At this time, the current is transferred to the battery of the energy storage robot from the charging pile, facilitating subsequent use.

In other embodiments of the present disclosure, since the energy storage system includes the energy storage robot according to any one of the above technical solutions, the energy storage system has any one of the technical effects of the solution of the energy storage robot as described above, and details are omitted herein.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

In view of this, an embodiment of the first aspect of the present disclosure provides an energy storage robot An embodiment of the second aspect of the present disclosure provides an energy storage system.

In order to achieve the above objects, an embodiment of the first aspect of the present disclosure provides an energy storage robot, including a base, a support, and a plurality of sensors. The base is provided with a battery therein and a moving device at a bottom of the base. The moving device is configured to drive the base to move relative to the ground. The support is detachably connected to the base. The support is provided with a plurality of solar panels electrically connected to the battery. The plurality of sensors is disposed at the base and/or the support and configured to detect a movement range and/or environmental information of the base. The plurality of solar panels has a storage state and an expanded state. In response to the battery generating power through the plurality of solar panels, the plurality of solar panels is controlled to be in the expanded state and to extend outwards, otherwise, the plurality of solar panels is controlled to be in the storage state.

According to the energy storage robot provided by the present disclosure, the energy storage robot mainly includes the base, the support, and the sensor. The battery disposed in base serves as an energy storage component, and the moving device is disposed at the base. The base can be driven to move under the action of the moving device, so that the mobile power supply within the predetermined region range is achieved. It can be understood that in the outdoor scene, the power demand at different places exists at different time points. At this time, the battery is driven by the moving device to move to different positions, which greatly improves the use convenience degree of the user and improves the usage experience of the user. In addition, the detachably connected support is further disposed at the base. By providing the solar panel at the support, in the case where the outdoor sunlight is strong and the power generation efficiency is high, the energy of the battery can be supplemented through the solar panel, thereby ensuring longer-time use. In this solution, the at least one of the base and the support is further provided with a sensor in their structure, which can obtain and determine the surrounding environment and the corresponding movement range of the energy storage robot. In this way, the movement control of the base, the movement control of the solar panel, and even the detection of the weather condition can be realized, thereby greatly improving the intelligence of the energy storage robot during use. The energy storage robot can be used as the ideal tool during user's actual use, to improve the user's usage experience.

In the solution, in a power generation state, the solar panel rotates to be folded and opened through structures like a hinge; and in a non-power generation state, rotation and stacked arrangement is implemented through a hinge or other manners. In some embodiments, when charging is not required, the solar panel is stacked and stored, which saves the space and keeps the appearance clean and tidy. When the mains supply is unavailable, the solar panel may provide charging for the battery, to lower a number of cycle use of the battery, prolonging a service life of the battery. According to the charging demand of the battery and a solar illumination condition, the expanded state and storage state of the solar panel can be flexibly controlled, improving the charging efficiency.

It needs to be emphasized that, in the solution, the solar panel located at the support is movable and has different states. In the first state, the light receiving area of the plurality of solar panels is small, which belongs to the storage state. Moreover, there is only one solar panel or no solar panel to receive light for charging the battery. In the second state, the light receiving area of the plurality of solar panels is large, which belongs to the expanded state. At this time, the solar panel is applied to the scene where sunlight is strong and high power is required for charging the battery.

It can be understood that the connection between the solar panel and the battery is an electrical connection. In some embodiments, a charging controller needs to be used for the connection between the solar panel and the battery. During the specific connection, the positive electrode and the negative electrode of the solar panel need to be connected to the positive electrode and the negative electrode of the charging controller, respectively. Then, the positive electrode and the negative electrode of the battery are connected to the positive electrode and the negative electrode of the charging controller, respectively.

An embodiment of the second aspect of the present disclosure provides an energy storage system, including a charging pile and the energy storage robot according to any one of items in the first aspect. The charging pile charges the energy storage robot in response to the energy storage robot moving to the charging position of the charging pile.

According to the energy storage system provided by the present disclosure, the energy storage system includes the charging pile and the energy storage robot. The charging pile may correspondingly have a chargeable range, i.e., the charging position. The charging pile charges the energy storage robot in response to the energy storage robot moving to the charging position of the charging pile. At this time, the current is transferred to the battery of the energy storage robot from the charging pile, facilitating subsequent use.

In other embodiments of the present disclosure, since the energy storage system includes the energy storage robot according to any one of the above technical solutions, the energy storage system has any one of the technical effects of the solution of the energy storage robot as described above, and details are omitted herein.

An embodiment of another aspect of the present disclosure provides an energy storage system, including: an electricity storage pile electrically connected to an energy storage device; and the energy storage robot according to any one of items of the first aspect. The energy storage robot transports electricity to the energy storage device through the electricity storage pile in response to the energy storage robot moving to an electricity storage position of the electricity storage pile.

According to the energy storage system provided by the present disclosure, the energy storage system includes the electricity storage pile and the energy storage robot. The electricity storage pile may correspondingly have a range capable of performing electricity storage, i.e., the electricity storage position. When the energy storage robot moves to the electricity storage position, the electricity can be transferred by the energy storage robot to the electricity storage pile, and then is finally transferred into the energy storage device through the connection between the electricity storage pile and the energy storage device, so as to facilitate the use of household electric device.

In one scene, the energy storage robot may be continuously charged in the daytime. The energy storage robot may automatically move to the electricity storage position for charging the energy storage device after its built-in battery is fully charged, and then go to the outdoor to absorb the solar energy for charging.

In other embodiments of the present disclosure, since the energy storage system includes the energy storage robot according to any one of the above technical solutions, the energy storage system has any one of the technical effects of the solution of the energy storage robots as described above, and details are omitted herein.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become apparent and readily appreciated from the following description of implementations in conjunction with the accompanying drawings, in which:

FIG. 3 is a schematic structural view of a solar panel according to an embodiment of the present disclosure;

FIG. 4 is a schematic structural view of an energy storage system according to an embodiment of the present disclosure;

FIG. 5 is a schematic structural view of an energy storage system according to an embodiment of the present disclosure;

REFERENCE SIGNS OF MAIN COMPONENTS

100, energy storage robot; 102, base; 1022, battery; 104, moving device; 106, support; 108, solar panel; 1082, plate support; 108, photovoltaic panel; 110, sensor; 112, storage box; 114, pull rod structure; 116, power supply panel; 1162, power supply interface; 118, sliding rail; 120, rotary shaft; 126, reflection panel; 128, controller; 130, timer; 132, positioning device; 134, second charging port; 210, electric pile device; 2102, first charging port; 136, electric quantity detection module; 138, timing device; 140, charging interface; 142, cover plate; 144, hinge;

200, energy storage system; 202, electricity storage pile; 204, charging pile; 206, energy storage device; 300, mains supply.

DETAILED DESCRIPTION

In order to understand the above objects, features and advantages of the present disclosure, embodiments of the present disclosure will be further described in detail below in conjunction with the accompanying drawings and specific implementations. It should be noted that embodiments of the present disclosure and features disclosed in the embodiments of the present disclosure can be combined with each other without conflicting.

In the following description, numerous specific details are provided to facilitate full understanding of the present disclosure. However, the embodiments of the present disclosure may also be implemented in other manners other than those described herein. Therefore, the scope of the present disclosure is not limited to the limitations of the specific embodiments disclosed below.

Some embodiments according to the present disclosure are described below with reference to FIG. 1 to FIG. 5.

Figure 1:
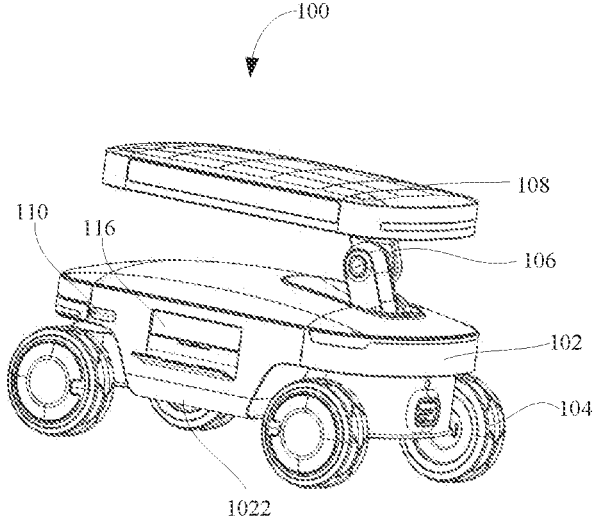
FIG. 1 is a schematic structural view of an energy storage robot according to an embodiment of the present disclosure.

As illustrated in FIG. 1, an energy storage robot 100 provided by the embodiment mainly includes a base 102, a support 106, and a sensor 110. The base 102 is provided with a battery 1022 which serves as an energy storage component. The base 102 is further provide with a moving device 104, and can be driven to move under the action of the moving device 104, so that mobile power supply within a predetermined region range is achieved. It can be understood that in an outdoor scene, power demand at different places exists at different time points. At this time, the battery 1022 is driven by the moving device 104 to move to different positions, which greatly improves use convenience degree of the user and improves usage experience of the user. In addition, the detachably connected support 106 is further disposed at the base 102. By providing a solar panel 108 at the support 106, in a case where outdoor sunlight is strong and power generation efficiency is high, energy of the battery 1022 can be supplemented through the solar panel 108, thereby ensuring longer-time use. In this solution, at least one of the base 102 and the support 106 is further provided with the sensor 110 in their structure, which can obtain and determine the surrounding environment and the corresponding movement range of the energy storage robot 100. In this way, movement control of the base 102, movement control of the solar panel 108, and even detection of weather conditions can be realized, thereby greatly improving the intelligence of the energy storage robot 100 during use. The energy storage robot 100 can be used as an ideal tool during user's actual use, to improve the user's usage experience.

It needs to be emphasized that, in the solution, the solar panel 108 located at the support 106 is movable and has different states. In a first state, a light receiving area of a plurality of solar panels 108 is small, which belongs to a storage state. Moreover, there is only one solar panel 108 or no solar panel 108 to receive light for charging the battery 1022. In a second state, the light receiving area of the plurality of solar panels 108 is large, which belongs to an expanded state. At this time, the solar panel is applied to a scene where sunlight is strong and high power is required for charging the battery 1022.

It can be understood that a connection between the solar panel 108 and the battery 1022 is an electrical connection. In some embodiments, a charging controller needs to be used for the connection between the solar panel 108 and the battery 1022. During the specific connection, a positive electrode and a negative electrode of the solar panel 108 need to be connected to a positive electrode and a negative electrode of the charging controller, respectively. Then, a positive electrode and a negative electrode of the battery 1022 are connected to the positive electrode and the negative electrode of the charging controller, respectively.

Further, the energy storage robot 100 can move as a whole. Moreover, a position of the support 106 relative to the base 102 is adjustable. In this way, an angle of the solar panel 108 is changeable. In addition, portability and the power generation efficiency are balanced, and photoelectric conversion efficiency is improved.

Further, a connection between the support 106 and the base 102 is a detachable connection, and specifically includes, but is not limited to, a magnetic connection, a snap connection, and the like, as long as the connection between the two are facilitated.

The moving device 104 may only be a vehicle wheel, and drives the base 102 to move through an external force, or the vehicle wheel is provided with a driving wheel of a motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

A track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on a steeper slope, is more stable, has a greater ground area than wheels, and can provide more stable driving.

In addition, a rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in an outdoor scene applied to a mountain land, the single-track structure can be used. In an outdoor scene applied to a flat square, the universal wheel structure can be used.

Figure 2:
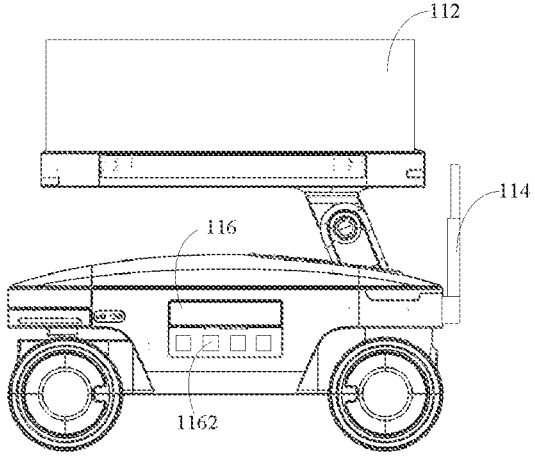
FIG. 2 is an exploded schematic view of a structure of an energy storage robot according to an embodiment of the present disclosure.

Further, as illustrated in FIG. 2, a storage box 112 is provided at the support 106, and can provide a predetermined storage space for the plurality of solar panels 108, allowing the plurality of solar panels 108 in the first state to be stored in the storage box 112. Therefore, a storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at a top of the storage box 112, i.e., at a side of the storage box 112 away from the base 102. In a case where the plurality of solar panels 108 is stored in the storage box 112, low-power continuous charging can still be performed by using the solar panel 108 located at a top side of the storage box 112.

The storage box 112 may be fixed at the support 106, or may be movably connected to the support 106.

Since a volume of the energy storage robot 100 relative to the sun is too small, and a distance between the sun and the energy storage robot 100 is too far, in a case where light emitted by the sun faces towards the plurality of solar panels 108 in the second state, angles between the solar panels 108 and the sunlight are the same by limiting the plurality of solar panels 108 to be parallel to each other. The plurality of solar panels 108 is utilized to effectively improve a point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in a case where one solar panel 108 is provided at the top of the storage box 112, the plurality of solar panels 108 is parallel to a top surface of the storage box 112.

In an embodiment, by limiting a rotational connection between the support 106 and the base 102, an angle of the support 106 can be effectively adjusted, enabling the solar panel 108 to generate power at high power generation efficiency by adjusting its posture within a rotation range.

Further, a rotation range between the support 106 and the base 102 is limited. In some embodiments, it is limited that the support 106, no matter how it rotates relative to the base 102, has an angle smaller than 60° from a horizontal plane, thereby achieving a better power generation effect.

In an embodiment, a pull rod structure 114 is provided at the base 102, which is convenient for the user to self-move the energy storage robot 100, with a more labor-saving operation. In some embodiments, the pull rod structure 114 is provided at a front side of the base 102, and the user pulls the base 102 through the pull rod structure 114; or the pull rod structure 114 is provided at a rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, a power supply panel 116 is provided at the base 102, so that a charging state and an output voltage of the battery 1022 can be displayed on the power supply panel 116. Meanwhile, a power supply interface 1162 can be utilized on the power supply panel 116 to provide an electric quantity to an outer space for use of a power supply device.

It can be understood that in a general electric scene, a user's electric device has non-uniform interface types. Therefore, the power supply panel 116 is provided with various kinds of power supply interfaces 1162 of different specifications, i.e., power supply interfaces 1162 in different interface types, to facilitate use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes a plate support 1082 and a photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during installation or use.

It needs to be supplemented that when the photovoltaic panel 1084 is mounted, a surface of the photovoltaic panel 1084 receiving the light is located at a top side of the photovoltaic panel 1084, i.e., the light receiving surface is located away from the base 102, thereby facilitating conversion of solar energy.

As illustrated in FIG. 5, the embodiment provides an energy storage system 200, mainly including a charging pile 204 and the energy storage robot 100. The charging pile may correspondingly have a chargeable range, i.e., the charging position. The charging pile charges the energy storage robot 100 in response to the energy storage robot 100 moving to the charging position of the charging pile. At this time, the current is transferred to the battery 1022 of the energy storage robot 100 from the charging pile 204, facilitating subsequent use.

In other embodiments of the present disclosure, since the energy storage system 200 includes the energy storage robot 100 according to any one of the above technical solutions, the energy storage system 200 has any one of the technical effects of the solution of the energy storage robot 100 as described above, and details are omitted herein.

In another embodiment, as illustrated in FIG. 4, there is also provided an energy storage system, including the electricity storage pile and the energy storage robot 100. The electricity storage pile may correspondingly have a range capable of performing electricity storage, i.e., the electricity storage position. When the energy storage robot 100 moves to the electricity storage position, electricity can be transferred by the energy storage robot to the electricity storage pile, and then is finally transferred into the energy storage device through a connection between the electricity storage pile 202 and the energy storage device 206, so as to facilitate use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system includes the energy storage robot 100 according to any one of the above embodiments, the energy storage system has any one of the technical effects of the solution of the energy storage robots 100 as described above, and details are omitted herein.

According to the energy storage robot and the energy storage system provided by the present disclosure, the energy storage robot can move as a whole. Moreover, the solar panel located at the support can adjust the light receiving area, balance portability and power generation efficiency, and improve the photoelectric conversion efficiency.

Some embodiments according to the present disclosure are described below with reference to FIG. 1 to FIG. 8.

As illustrated in FIG. 1, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

It needs to be emphasized that, in the solution, the solar panel 108 located at the support 106 is movable and has different states. In the storage state, the light receiving area of the plurality of solar panels 108 is small, which belongs to the storage state. Moreover, there is only one solar panel 108 or no solar panel 108 to receive the light for charging the battery 1022. In the expanded state, the light receiving area of the plurality of solar panels 108 is large, which belongs to the expanded state. At this time, the solar panel is applied to the scene where the sunlight is strong and high power is required for charging the battery 1022.

Further, as illustrated in FIG. 2, the storage box 112 is provided at the support 106, which can provide the predetermined storage space for the plurality of solar panels 108, allowing the plurality of solar panels 108 in the storage state to be stored in the storage box 112. Therefore, the storage space of the solar panel 108 is greatly reduced, and the portability is improved. In the expanded state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Figures 6, 7:
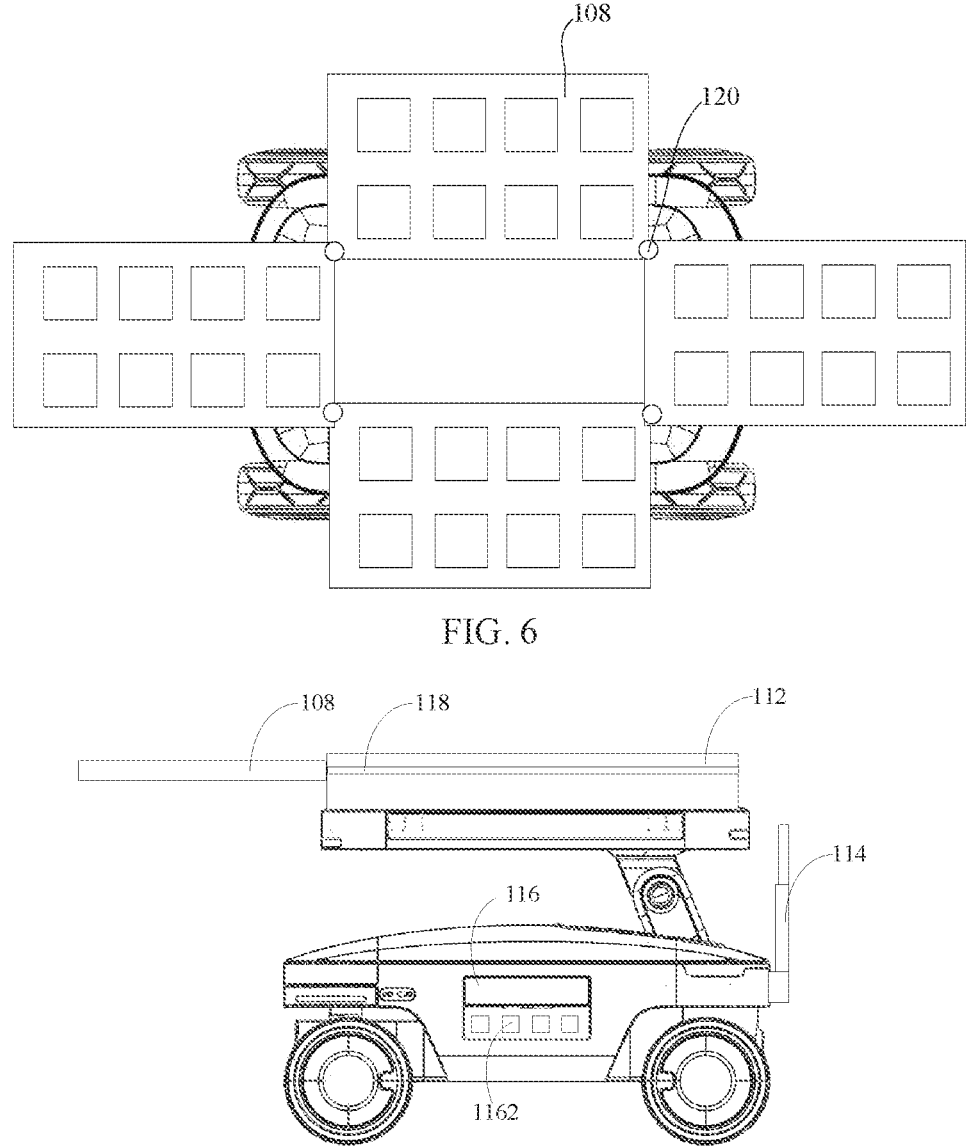
FIG. 6 is a schematic structural view of an energy storage robot according to an embodiment of the present disclosure.
FIG. 7 is a schematic structural view of an energy storage robot according to an embodiment of the present disclosure.

As illustrated in FIG. 7, for the plurality of solar panels 108, a connection between the solar panel 108 and the storage box is a sliding connection, i.e., when the solar panel 108 is switched between the storage state and the expanded state, relative sliding occurs between the solar panel 108 and the storage box. In some embodiments, the storage box is provided with a plurality of sliding rails 118, and each solar panel 108 is connected to the sliding rail 118, to realized sliding relative to the storage box under the action of the sliding rail 118. On this basis, by limiting the heights of the plurality of sliding rails 118 to be different, the plurality of solar panels 108 in the storage state can be stacked and stored by using a space in a height direction, thereby reducing unnecessary space occupation. In the expanded state, the plurality of solar panels 108 can slide outwards by using the sliding rail 118, to facilitate an improvement in the power generation efficiency.

In a specific embodiment, as illustrated in FIG. 2, the storage box is in a cuboid shape. For four side walls of the storage box, the sliding rail 11 is disposed on each of two opposite side walls of the storage box. Every two sliding rails 118 having a same height are connected to one solar panel 108, so that the solar panel 108 extends outwards or retracts.

Further, as illustrated in FIG. 6, for the plurality of solar panels 108, the connection between the solar panel 108 and the storage box is a rotational connection, i.e., when the solar panel 108 is switched between the storage state and the expanded state, relative rotation occurs between the solar panel 108 and the storage box. In some embodiments, the storage box is provided with a plurality of rotary shafts 120, and each solar panel 108 is connected to the rotary shaft 120, to realize rotation relative to the storage box under the action of the rotary shaft 120. On this basis, by limiting the heights of the plurality of rotary shafts 120 to be different, the plurality of solar panels 108 in the storage state can be stacked and stored by using the space in the height direction, thereby reducing the unnecessary space occupation. In the expanded state, the plurality of solar panels 108 can be rotated and pushed outwards by using the sliding rail 118, to facilitate the improvement in the power generation efficiency.

Figures 8, 9:
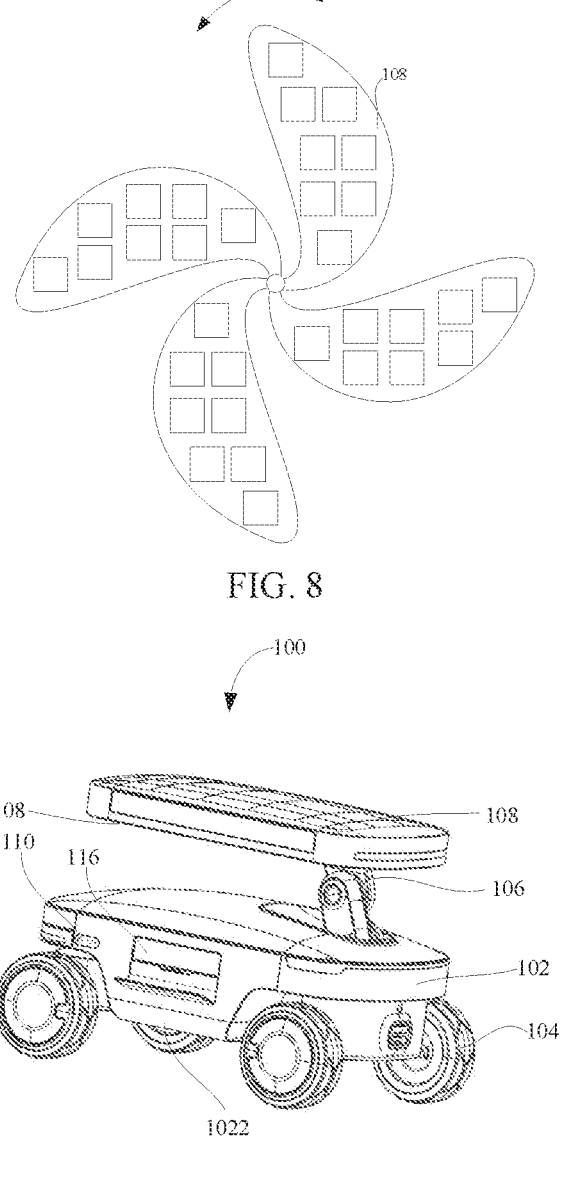
FIG. 8 is a schematic structural view of a plurality of solar panels being expanded according to an embodiment of the present disclosure.
FIG. 9 is a schematic structural view of an energy storage robot according to an embodiment of the present disclosure.

In a specific embodiment, as illustrated in FIG. 8, when the plurality of solar panels 108 is in the expanded state, and when the solar panel 108 extends outwards, an extending direction is circumferential, and the plurality of solar panels 108 extends outwards in a petal diffusion shape.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photo-electric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Since the volume of the energy storage robot 100 relative to the sun is too small, and the distance between the sun and the energy storage robot 100 is too far, in the case where light emitted by the sun faces towards the plurality of solar panels 108 in the expanded state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photo-voltaic panel 1084. The plate support 1082 is disposed at the support 106 and is fixedly connected to or movably con-nected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile may correspondingly have a chargeable range, i.e., the charging position. The charging pile charges the energy storage robot 100 in response to the energy storage robot 100 moving to the charging position of the charging pile. At this time, the current is transferred to the battery 1022 of the energy storage robot 100 from the charging pile 204, facilitating subsequent use.

In other embodiments of the present disclosure, since the energy storage system 200 includes the energy storage robot 100 according to any one of the above technical solutions, the energy storage system 200 has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile 202 may correspondingly have a range capable of performing electricity storage, i.e., the electricity storage position. When the energy storage robot 100 moves to the electricity storage position, the electricity can be transferred by the energy storage robot 100 to the electricity storage pile, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system includes the energy storage robot 100 according to any one of the above embodiments, the energy storage system has any one of the technical effects of the solution of the energy storage robots 100 as described above, and details are omitted herein.

According to the energy storage robot and the energy storage system provided by the present disclosure, the plurality of solar panels is utilized, which can balance the charging efficiency and the storage space and facilitate carrying and transportation.

Some embodiments according to the present disclosure are described below with reference to FIG. 3 to FIG. 5 and FIG. 9 and FIG. 10.

As illustrated in FIG. 9, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

In a specific embodiment, some of the solar panels 108 are disposed at a side of the support 106 facing towards the base, and some of the solar panels 108 are disposed at a side of the support 106 away from the base. For the solar panel 108, an arrangement position of the solar panel 108 is related to an orientation. In this solution, a part of the solar panels is provided at a top side of the support 106, and another part of the solar panels is provided at a bottom side of the support 106. Solar energy at some special angles can be received through the solar panels 108 at the two sides of the support 106, such that a scene where the energy storage robot absorbs solar energy can be improved, widening an application range of the product.

The solar panel located 108 at the side of the support 106 facing towards the base cannot directly receive the solar energy and can only perform absorption through reflections of other structures. However, compared with the solar panel 108 only located at the top side, the power generation efficiency of the energy storage robot under the same condition is superposition of power generation efficiency of a front solar panel and power generation efficiency of a back solar panel, and the power generation efficiency is greater.

Figure 10:
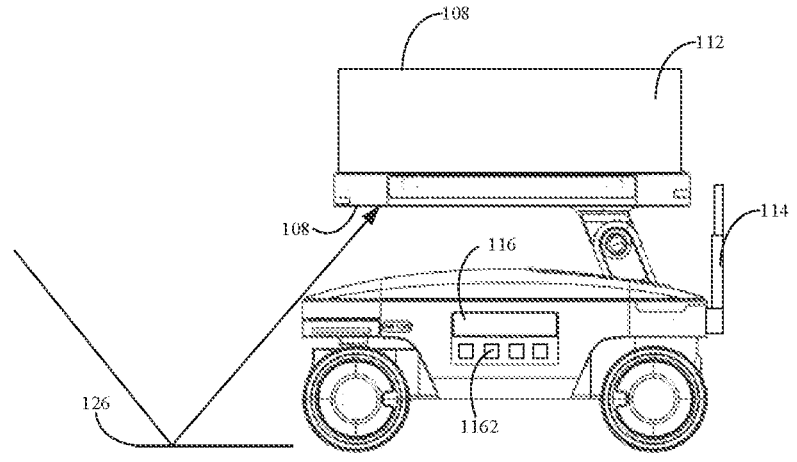
FIG. 10 is an exploded schematic view of a structure of an energy storage robot according to an embodiment of the present disclosure.

Further, as illustrated in FIG. 10, a reflection panel 126 is disposed at the ground, and the reflection panel 126 acts to reflect the sunlight onto the solar panel 108, thereby increasing an intensity of the light received by the solar panel 108 and improving the power generation efficiency of the solar panel 108. In some embodiments, the base moves through the moving device. When the base moves to a region corresponding to the reflection panel 126, the light can intensively enter the solar panel 108 disposed at the side of the support 106 facing towards the base through the reflection panel 126, so that the power generation efficiency is improved.

In a specific embodiment, the sensor 110 is selected as a light sensor. The angle of the solar panel 108 and/or the position of the base are adjusted according to a light parameter detected by the light sensor, so that the solar panel 108 can receive a maximum illumination intensity, improving the power generation efficiency. In some embodiments, the light sensor may monitor light parameters, such as an illumination intensity, a light direction, and the like in real time. According to the above-mentioned parameters, the angle between the solar panel 108 and the horizontal plane can be adjusted through the movement of the support 106, so that the angle corresponds to the light parameter. Meanwhile, a position of the base relative to the ground may be adjusted to correspond to the light parameter. In this way, the solar panel 108 can always keep an optimal angle and position for receiving the illumination, so that the comprehensive power generation efficiency reaches the maximum, which can significantly improve power generation performance of the whole system.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 10, the storage box 112 is provided at the support 106, which can provide the predetermined storage space for the plurality of solar panels 108, allowing the plurality of solar panels 108 in the first state to be stored in the storage box 112. Therefore, the storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile 204 may correspondingly have a chargeable range, i.e., the charging position. The charging pile 204 charges the energy storage robot 100 in response to the energy storage robot 100 moving to the charging position. At this time, the current is transferred to the battery 1022 of the energy storage robot 100 from the charging pile 204, facilitating subsequent use.

In other embodiments of the present disclosure, since the energy storage system 200 includes the energy storage robot 100 according to any one of the above technical solutions, the energy storage system 200 has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile 202 may correspondingly have a range capable of performing electricity storage, i.e., the electricity storage position. When the energy storage robot 100 moves to the electricity storage position, the electricity can be transferred by the energy storage robot 100 to the electricity storage pile 202, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system includes the energy storage robot 100 according to any one of the above embodiments, the energy storage system has any one of the technical effects of the solution of the energy storage robots 100 as described above, and details are omitted herein.

According to the energy storage robot and the energy storage system provided by the present disclosure, the solar panel is provided at each of the top side and the bottom side of the support, so that the scene where the energy storage robot absorbs solar energy can be improved, improving the application range of the product.

Some embodiments according to the present disclosure are described below with reference to FIG. 2 to FIG. 5 and FIG. 11.

Figure 11:
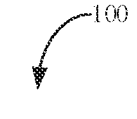
FIG. 11 is a schematic structural view of an energy storage robot according to an embodiment of the present disclosure.
Figure 11:
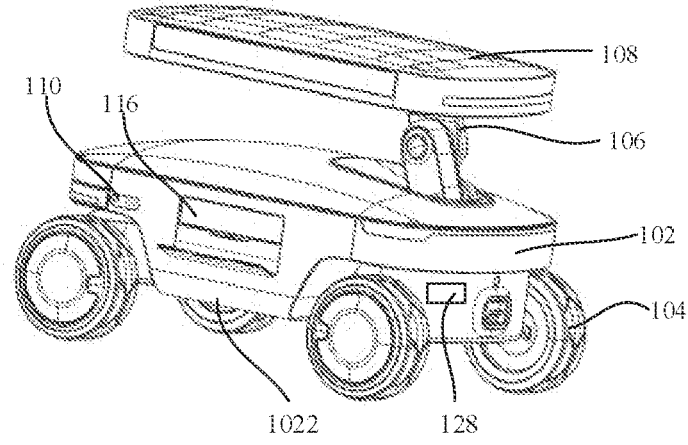

As illustrated in FIG. 11, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

In the embodiment, by providing the controller 128, the movement of the at least one of solar panels 108 can be controlled according to the environmental information determined by the sensor 110, enabling the controller 128 to receive a maximum illumination intensity, improving power generation efficiency. In some embodiments, the sensor 110 may monitor the environmental information in real time, such as an illumination intensity, a light direction, a temperature, and the like. Then, the controller 128 is electrically connected to the sensor 110 and the moving device. The movement of the solar panel 108 is controlled according to the environmental information determined by the sensor 110. This may include adjusting an angle of the solar panel 108 and/or a position of the base, enabling the solar panel 108 to be always kept at an optimal angle and position for receiving the illumination, thereby making comprehensive power generation efficiency reach the maximum. Therefore, intelligent control is achieved, and stability and reliability of the system are improved.

Further, the sensor 110 is configured to obtain orientation information and distance information, to control the movement of the at least one of solar panels 108 according to the orientation information and the distance information of the obstacle detected by the sensor 110, to achieve intelligent avoidance.

In some embodiments, the sensor 110 may be configured to detect the orientation information and distance information of the obstacle within at least one range, such as a wall, a building, and a tree. Then, the controller 128 can adjust a movement position of the solar panel 108 according to the information, to avoid blocking of the obstacle, such that the solar panel 108 can be always kept at the optimal position for receiving the illumination, thereby making the comprehensive power generation efficiency reach the maximum.

In another embodiment, the controller 128 may determine whether a collision of the solar panel 108 with the obstacle occurs when the solar panel 108 moves to the second state according to the orientation information and the distance information of the obstacle detected by the sensor 110. In response to the controller 128 determining that the collision of the solar panel 108 with the obstacle occurs, the controller 128 will take measures to avoid the occurrence of collision. Specific measures include, but are not limited to, moving the solar panel 108 to a position at a predetermined distance from the obstacle, or moving the solar panel 108 back to the first state. By using the sensor 110 to detect the orientation information and the distance information of the obstacle, the controller 128 may automatically adjust the movement position of the solar panel 108 to avoid the occurrence of collision, thereby improving the stability and reliability of the system.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 2, the storage box 112 is provided at the support 106, which can provide the predetermined storage space for the plurality of solar panels 108, allowing the plurality of solar panels 108 in the storage state to be stored in the storage box 112. Therefore, the storage space of the solar panel 108 is greatly reduced, and the portability is improved. In the expanded state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile may correspondingly have a chargeable range, i.e., the charging position. The charging pile charges the energy storage robot 100 in response to the energy storage robot 100 moving to the charging position. At this time, the current is transferred to the battery 1022 of the energy storage robot 100 from the charging pile 204, facilitating subsequent use.

In other embodiments of the present disclosure, since the energy storage system includes the energy storage robot 100 according to any one of the above technical solutions, the energy storage system has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile 202 may correspondingly have a range capable of performing electricity storage, i.e., the electricity storage position. When the energy storage robot 100 moves to the electricity storage position, the electricity can be transferred by the energy storage robot 100 to the electricity storage pile, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system includes the energy storage robot 100 according to any one of the above embodiments, the energy storage system has any one of the technical effects of the solution of the energy storage robots 100 as described above, and details are omitted herein.

According to the energy storage robot and the energy storage system provided by the present disclosure, the controller may perform obstacle avoidance control on expansion of the solar panel according to environmental information of an environment where the controller is located.

Some embodiments according to the present disclosure are described below with reference to FIG. 2 to FIG. 5 and FIG. 12.

Figures 12, 13:
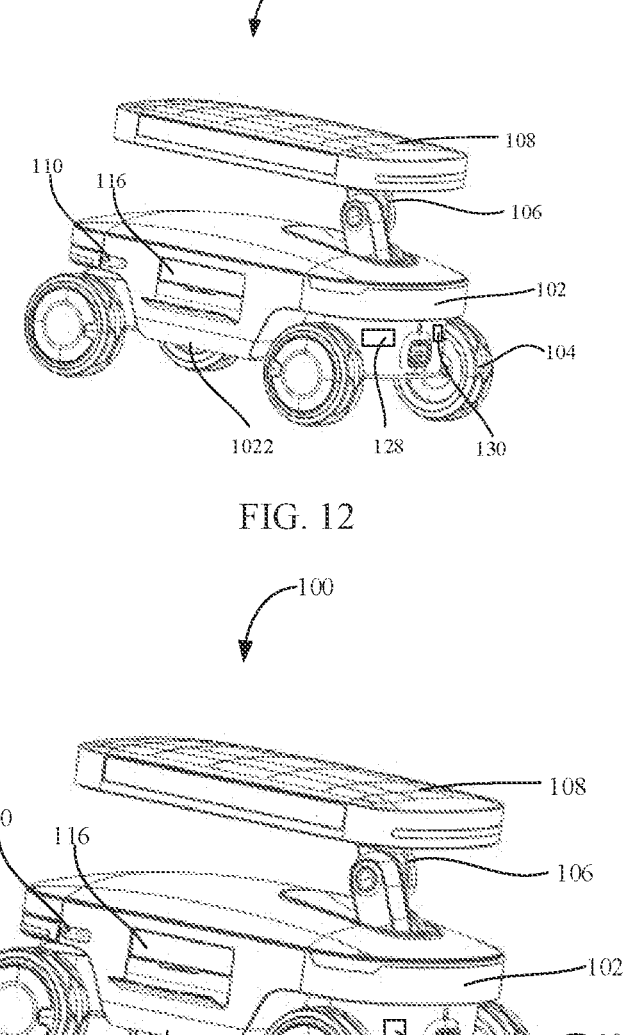
FIG. 12 is a schematic structural view of an energy storage robot according to an embodiment of the present disclosure.
FIG. 13 is a schematic structural view of an energy storage robot according to an embodiment of the present disclosure.

As illustrated in FIG. 12, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

The system may detect the position information of the obstacle by using the plurality of sensors 110, to ensure that no collision of the solar panel 108 with the obstacle occurs during the movement of the solar panel 108. In addition, the system can also automatically adjust the position of the solar panel 108 according to a difference between the light receiving area of the solar panel 108 in the first state and the light receiving area of the solar panel 108 in the second state, allowing the solar panel 108 to receive the maximum illumination intensity, thereby improving the power generation efficiency.

When the solar panel 108 is in the second state, the controller 128 may determine the movement range of the moving device according to the position information of the obstacle detected by the sensor 110. The controller 128 controls the moving device to move to other positions within the movement range, so that the solar panel 108 is not in contact with the obstacle, thereby realizing intelligent obstacle avoidance during movement. By using the plurality of sensors 110 to detect the position information of the obstacle, the controller 128 may automatically adjust the movement position of the solar panel 108 to avoid the occurrence of collision, thereby improving the stability and reliability of the system. Meanwhile, the system may also automatically adjust the position of the solar panel 108 according to a difference between the light receiving areas of the solar panel 108 in different states, to improve the power generation efficiency.

It needs to be supplemented that the energy storage robot of the solution has a sentinel mode to monitor surrounding objects. In a case where the solar panel 108 is in the expanded state, when a trolley moves, or the solar panel 108 is controlled to adjust its orientation, it will be monitored that whether there is an obstacle likely to have a collision around the robot ceaselessly. In response to the occurrence of the obstacle likely to have the collision around the robot, the trolley or the solar panel 108 is controlled to avoid the obstacle.

In a specific embodiment, the sensor 110 is selected as a light sensor, and the controller 128 enables the solar panel 108 to always face towards the sun, thereby maximally improving collection efficiency of the solar energy. In addition, in the solution, on the basis of controlling the movement of the solar panel 108, an obstacle avoidance limitation is further performed, i.e., in the expanded second state, the solar panel 108 needs to consider whether the current position of the solar panel 108 is in contact with the obstacle during obstacle avoidance, thereby improving use safety of the entire system.

In another specific embodiment, a timer 130 may be further provided to periodically perform obstacle detection, thereby reducing a possibility that obstacle avoidance cannot be achieved timely due to a movement of the obstacle itself after preliminary detection is completed. Therefore, the usage experience of the user is improved, and the use safety of the product is also improved.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photo-electric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 10, the storage box 112 is provided at the support 106, which can provide the prede-termined storage space for the plurality of solar panels 108, allowing the plurality of solar panels 108 in the first state to be stored in the storage box 112. Therefore, the storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile 204 may correspondingly have a chargeable range, i.e., the charging position. The charging pile 204 charges the energy storage robot 100 in response to the energy storage robot 100 moving to the charging position. At this time, the current is transferred to the battery 1022 of the energy storage robot 100 from the charging pile 204, facilitating subsequent use.

In other embodiments of the present disclosure, since the energy storage system 200 includes the energy storage robot 100 according to any one of the above technical solutions, the energy storage system 200 has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile 202 may correspondingly have a range capable of performing electricity storage, i.e., the electricity storage position. When the energy storage robot 100 moves to the electricity storage position, the electricity can be transferred by the energy storage robot 100 to the electricity storage pile 202, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system 200 includes the energy storage robot 100 according to any one of the above embodiments, the energy storage system 200 has any one of the effects of the solution of the energy storage robots 100 as described above, and details are omitted herein.

According to the energy storage robot and the energy storage system provided by the present disclosure, in the case where the solar panel is expanded, when the trolley moves, or when the solar panel is controlled to adjust the orientation, it is detected that whether there is an obstacle likely to have a collision around the robot ceaselessly, to perform avoidance in time.

Some embodiments according to the present disclosure are described below with reference to FIG. 1 to FIG. 5 and FIG. 13.

As illustrated in FIG. 1, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

In this solution, in a power generation mode, the sensor 110 detects outdoor sunlight at any time, and determines an optimal power generation position in a predetermined region and an optimal power generation angle of the solar panel 108 through a specific algorithm. In some embodiments, each of the base and the support 106 is provided with a plurality of sensors 110 for determining the movement range and the illumination information of the base 102, enabling the energy storage robot 100 to be adaptively adjusted according to real-time environmental information. The solar panel 108 is rotatable relative to the support 106 to adjust the incident angle of light. In this way, the solar panel 108 is always kept under an optimal illumination condition, improving the photovoltaic conversion efficiency. Further, by intelligently controlling the position and angle of the solar panel 108 and the movement of the base 102, the energy storage robot 100 can achieve the optimal photovoltaic conversion efficiency in different environments, thereby improving an energy utilization rate and lowering energy consumption.

In an embodiment, as illustrated in FIG. 13, the controller 128 calculates comprehensive photovoltaic conversion efficiency of the plurality of solar panels 108 at a plurality of positions according to the illumination information obtained by the sensor 110. It is helpful to find an optimal working state of each solar panel 108 in different environments, thereby improving an overall energy utilization rate. The controller 128 determines angle information of the plurality of solar panels 108 with the highest comprehensive photovoltaic conversion efficiency and position information of the base 102 according to the calculated comprehensive photovoltaic conversion efficiency. It is helpful to achieve adaptive adjustment of the solar panel 108 and an intelligent movement of the base 102 to achieve optimal photovoltaic conversion efficiency. Further, the controller 128 controls the rotation of the solar panel 108 relative to the support 106 and the movement of the base 102 according to the determined optimal angle information and the position information, to realize automagical adjustment on the angle of the solar panel 108 and the position of the base 102, thereby improving the overall photovoltaic conversion efficiency.

Further, a positioning device 132 is used to make it cooperate with the controller 128, such that automatic adjustment of the angle of the solar panel 108 and accurate positioning of the base 102 are realized, thereby improving the photovoltaic conversion efficiency and the energy utilization rate. In some embodiments, the controller 128 determines sunlight direction information based on the longitude and latitude information and then controls the solar panel 108 to rotate to an angle with a maximum solar normal radiation amount based on the sunlight direction information. In this way, the solar panel 108 can be always kept under the optimal illumination condition, thereby improving the photovoltaic conversion efficiency.

It should be noted that, with the change of time, each of the optimal power generation position and the optimal power generation angle changes. In a predetermined region, an illumination direction is fixed. Therefore, a corresponding sunlight direction can be determined through a longitude and latitude where the energy storage robot 100 is located. A first power generation angle is determined firstly, then a power generation position is determined according to an actual cloud condition, and finally adjustment is realized.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 2, the storage box 112 is provided at the support 106, which can provide the predetermined storage space for the plurality of solar panels 108, allowing the plurality of solar panels 108 in the first state to be stored in the storage box 112. Therefore, the storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile 204 may correspondingly have a chargeable range, i.e., the charging position. The charging pile 204 charges the energy storage robot 100 in response to the energy storage robot 100 moving to the charging position. At this time, the current is transferred to the battery 1022 of the energy storage robot 100 from the charging pile 204, facilitating subsequent use.

In other embodiments of the present disclosure, since the energy storage system 200 includes the energy storage robot 100 according to any one of the above technical solutions, the energy storage system 200 has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile 202 may correspondingly have a range capable of performing electricity storage, i.e., the electricity storage position. When the energy storage robot 100 moves to the electricity storage position, the electricity can be transferred by the energy storage robot 100 to the electricity storage pile 202, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system 200 includes the energy storage robot 100 according to any one of the above embodiments, the energy storage system 200 has any one of the technical effects of the solution of the energy storage robots 100 as described above, and details are omitted herein.

According to the energy storage robot 100 and the energy storage system 200 provided by the present disclosure, adaptive adjustment is performed according to the real-time environmental information, and the solar panel 108 is rotatable relative to the support 106 to adjust the incident angle of the light, thereby improving the photovoltaic conversion efficiency.

Some embodiments according to the present disclosure are described below with reference to FIG. 1 to FIG. 3 and FIG. 14.

Figure 14:
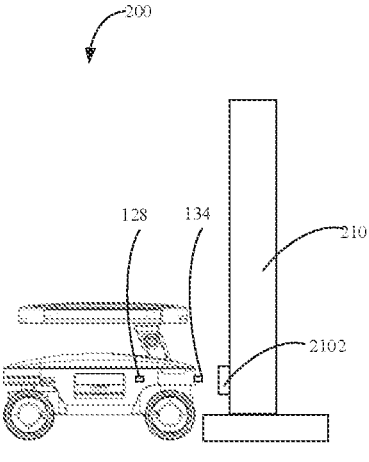
FIG. 14 is a schematic structural view of an energy storage system according to an embodiment of the present disclosure.

As illustrated in FIG. 1 and FIG. 14, the embodiment provides an energy storage system 200. The energy storage system 200 includes an electric pile device 210 and the energy storage robot 100. The energy storage robot 100 mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

The solution mainly includes an electric pile device 210 and the energy storage robot 100. The electric pile device 210 has a first charging port 2102 defined thereon. The energy storage robot 100 has a second charging port 134 defined thereon, and a position of the second charging port 134 is mobilizable. The electric pile device 210 provides a charging interface for the energy storage robot 100 to be connected and charged. For the energy storage robot 100, after the energy storage robot 100 moves to the charging range, the second charging port 134 automatically adjusts its height, so that the second charging port 134 is connected to the first charging port 2102. It can be understood that when the plurality of electric pile devices 210 is provided and can be used for charging the energy storage robot 100, since a difference may occur in height positions of the different electric pile devices 210, when the robot is matched with different charging piles, adjustments of the robot position in a vertical direction are performed.

It needs to be supplemented that, in this solution, the energy storage robot 100 may automatically find and connect to the electric pile device 210 according to data of the sensor 110, to realize automatic charging and improve charging efficiency and convenience.

Further, except for solar energy charging, the energy storage robot 100 may support other charging modes, for example, using the electric pile device 210 to perform alternating current charging, wireless charging, and the like, so as to meet different requirements of users.

In addition, the energy storage robot 100 may automatically schedule a charging task according to information like the rest of electric quantity of the battery 1022 and charging requirements, thereby improving the charging efficiency.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In an embodiment, each of a height of the first charging port 2102 on the electric pile device 210 and a height of the second charging port 134 on the energy storage robot 100 is adjustable, so that the connection is more flexible and adapts to different scenes and requirements.

Further, a laser sensor is used. The electric pile device 210 is automatically found and connected according to light information received by the laser sensor, so that automatic charging is realized, improving the charging efficiency and convenience. In some embodiments, the laser sensor transmits the light information outwards, and the height of the second charging port 134 is automatically adjusted according to light information that is reflected by the electric pile device 210 and enters the laser sensor, to achieve an accurate engagement with the first charging port 2102 on the electric pile device 210.

Alternatively, a Hall sensor may be used. The position of the second charging port 134 of the electric pile device 210 is automatically found according to magnetic field information received by the Hall sensor, and the magnetic field information received by the Hall sensor may help the energy storage robot 100 to accurately adjust the height of the second charging port 134, thereby achieving the accurate engagement with the first charging port 2102 on the electric pile device 210 and connecting the first charging port 2102 on the electric pile device 210 to realize automatic charging.

It needs to be supplemented that after the second charging port 134 is connected to the first charging port 2102, the controller 128 may automatically determine whether to charge the energy storage robot 100 or to transport the electric quantity to the energy storage device. It can be understood that in some scenes, the energy storage robot 100 may transport the rest of electric quantity thereof back to the electric pile device 210, which realizes bidirectional charging and improves the energy utilization efficiency.

Further, the controller 128 may automatically adjust a charging strategy and a discharging strategy of the energy storage robot 100 according to a power grid demand response signal, thereby reducing power grid load.

In one embodiment, the moving device 104 may employ a single-track structure, including only one type of track.

In another embodiment, the moving device 104 employs a single universal wheel structure, including only one type of universal wheel.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 2, the storage box 112 is provided at the support 106, which can provide the predetermined storage space for the plurality of solar panels 108, allowing the plurality of solar panels 108 in the first state to be stored in the storage box 112. Therefore, the storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

According to the energy storage system 200 provided by the present disclosure, when the energy storage robot 100 is aligned with the electric pile device 210, the height of the second charging port 134 can be flexibly adjusted to facilitate a connection with the first charging port 2102 on the electric pile device 210.

Some embodiments according to the present disclosure are described below with reference to FIG. 1 to FIG. 3 and FIG. 15.

Figure 15:
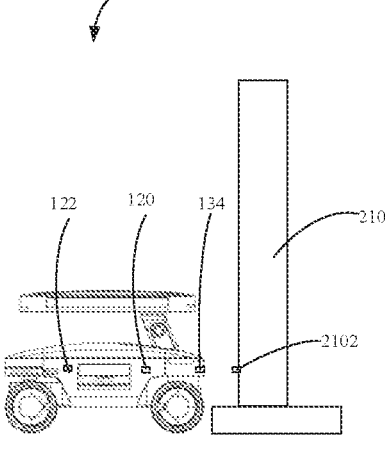
FIG. 15 is a schematic structural view of an energy storage system according to an embodiment of the present disclosure.

As illustrated in FIG. 1 and FIG. 15, the embodiment provides an energy storage system 200. The energy storage system 200 includes an electric pile device 210 and the energy storage robot 100. The energy storage robot 100 mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

In this solution, by providing an electric quantity detection module 136, a capacity of a built-in battery of the base can be detected, i.e., the rest of electric quantity of the battery is determined, and a corresponding electric quantity interaction strategy can be determined according to the rest of electric quantity. In some embodiments, when a mains supply is powered off, the controller 128 can automatically switch to supply power by using the battery of the energy storage robot, which can supply power to the home by using the battery power to ensure normal operation of an electric device connected to the mains supply. When the robot is out of power, the energy storage robot can be powered through household electricity.

It needs to be supplemented that, in this solution, the energy storage robot 100 may automatically find and connect to the electric pile device 210 according to the data of the sensor, to realize the automatic charging and improve the charging efficiency and convenience.

Further, except for solar energy charging, the energy storage robot 100 may support other charging modes, for example, using the electric pile device 210 to perform alternating current charging, wireless charging, and the like, so as to meet different requirements of users.

In addition, the energy storage robot 100 may automatically schedule a charging task according to information like the rest of electric quantity of the battery 1022 and charging requirements, thereby improving the charging efficiency.

In addition, a timing device 138 is further provided, is electrically connected to the controller 128, and is configured to obtain a peak power period and a valley period of the mains supply. The controller 128 supplies, in the peak power period, power to the electric device connected to the mains supply by using the battery, thereby lowering a peak load and facilitating energy conservation and emission reduction. The controller 128 charges, in the valley power period, the battery of the energy storage robot by using the mains supply, which fully utilizes power resources in the valley period.

Further, the influence of factors like a peak-valley electricity price policy and a power grid demand response can also be added, to further adjust the electric quantity interaction strategy.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In an embodiment, each of the height of the first charging port 2102 on the electric pile device 210 and the height of the second charging port 134 on the energy storage robot 100 is adjustable, so that the connection is more flexible and adapts to different scenes and requirements.

Further, the laser sensor is used. The electric pile device 210 is automatically found and connected according to the light information received by the laser sensor, so that the automatic charging is realized, improving the charging efficiency and convenience. In some embodiments, the laser sensor transmits the light information outwards, and the height of the second charging port 134 is automatically adjusted according to the light information that is reflected by the electric pile device 210 and enters the laser sensor, to achieve the accurate engagement with the first charging port 2102 on the electric pile device 210.

Alternatively, the Hall sensor may be used. The position of the second charging port 134 of the electric pile device 210 is automatically found according to the magnetic field information received by the Hall sensor, and the magnetic field information received by the Hall sensor may help the energy storage robot 100 to accurately adjust the height of the second charging port 134, thereby achieving the accurate the engagement with the first charging port 2102 on the electric pile device 210 and connecting the first charging port 2102 on the electric pile device 210 to realize automatic charging.

It needs to be supplemented that after the second charging port 134 is connected to the first charging port 2102, the controller 128 may automatically determine whether to charge the energy storage robot 100 or to transport the electric quantity to the energy storage device. It can be understood that in some scenes, the energy storage robot 100 may transport the rest of electric quantity thereof back to the electric pile device 210, which realizes bidirectional charging and improves the energy utilization efficiency.

Further, the controller 128 may automatically adjust the charging strategy and the discharging strategy of the energy storage robot 100 according to the power grid demand response signal, thereby reducing the power grid load.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 2, the storage box 112 is provided at the support 106, which can provide the predetermined storage space for the plurality of solar panels 108, allowing the plurality of solar panels 108 in the first state to be stored in the storage box 112. Therefore, the storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

According to the energy storage system provided by the present disclosure, the electric quantity is enabled to move between the energy storage robot and the electric pile device. The electric quantity stored by the energy storage robot itself is used for supplying power to the electric device connected to the mains supply or charging the energy storage robot through the household electricity.

Some embodiments according to the present disclosure are described below with reference to FIG. 1 to FIG. 5 and FIG. 16.

As illustrated in FIG. 1, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

Figure 16:
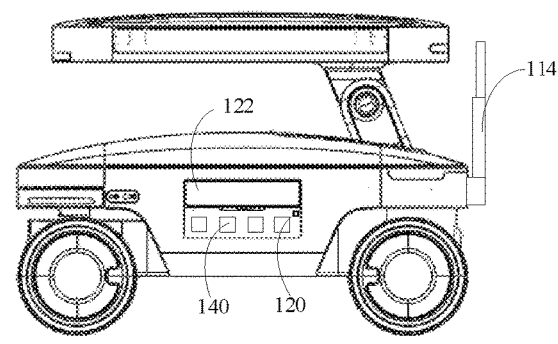
FIG. 16 is a schematic structural view of an energy storage robot according to an embodiment of the present disclosure.
Figure 17:
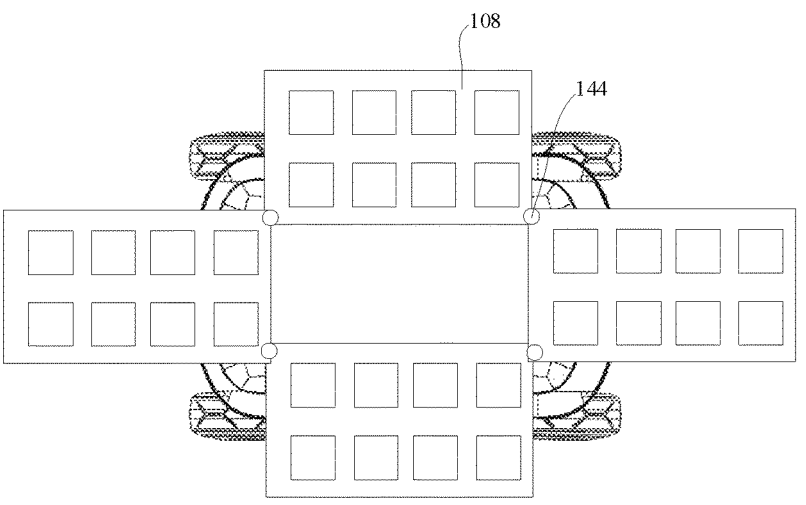
FIG. 17 is a schematic structural view of an energy storage robot according to an embodiment of the present disclosure.
Figure 18:
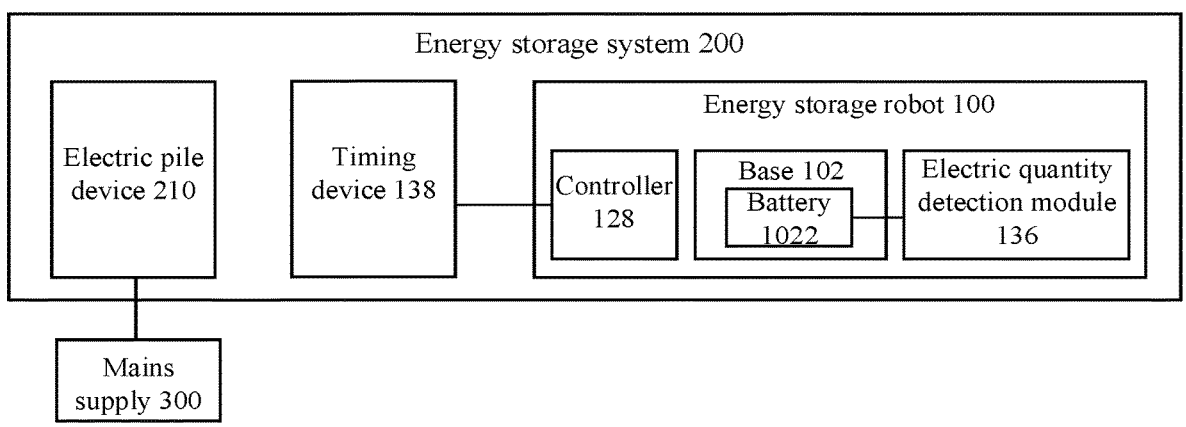
FIG. 18 is a schematic view of an energy storage system according to an embodiment of the present disclosure.

As illustrated in FIG. 16, by providing the plurality of charging interfaces 140, the charging requirements of the energy storage robots of different specifications and models can be satisfied, to improve universality and compatibility of the device. When a predetermined type of device needs to be charged, only a circuit of a corresponding charging interface 140 is turned on, i.e., only the corresponding charging interface 140 is controlled to be in communication with the battery, such that power supply can be achieved through the charging interface 140, and the rest of charging interfaces 140 are not powered on, avoiding safety hazards such as short circuit and overcurrent. It can be understood that the sensor can detect the interface type, and the controller 128 automatically selects the corresponding charging interface 140 according to the interface type detected by the sensor, thereby simplifying the charging process and improving the charging efficiency. In an actual use process, the user can replace the charging interfaces 140 of different specifications at any time as required, thereby improving the user's usage experience.

In an embodiment, when a charging interface 140 having a cover plate 142 is not in use, dust and moisture can be prevented from entering the device, which improves a protection level of the device and prolongs the service of the device; when the controller 128 selects one charging interface 140 to be in communication with the battery, cover plates 142 related to other charging interfaces 140 are kept in a closed state, so that electrical potential safety hazards caused by mistaken touch are prevented; and the controller 128 automatically controls the cover plate 142 related to the corresponding charging interface 140 to open according to the interface type, such that the user operation is simplified, and the usage convenience is improved.

The cover plate 142 is rotatably connected to or slidably connected to a wall surface. In a case where a rotational connection between the cover plate 142 and the wall surface is used, friction may occur during rotation, resulting in wear and noise, but a structure of the rotational connection is simple, low in cost, and convenient to install and maintain. In a case where a sliding connection between the cover plate 142 and the wall surface is used, the movement is stable, the noise is low, and the method is suitable for occasions with high requirements for movement precision. In practical applications, choosing which connection mode needs to be balanced according to specific usage scenes, cost budget, and performance requirements.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 2, the storage box 112 is provided at the support 106, which can provide the predetermined storage space for the plurality of solar panels 108, allowing the plurality of solar panels 108 in the first state to be stored in the storage box 112. Therefore, the storage space of the solar panel 108 is greatly reduced, and the portability is improved. In the second state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the second state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile may correspondingly have a chargeable range, i.e., the charging position. The charging pile charges the energy storage robot 100 in response to the energy storage robot 100 moving to the charging position. At this time, the current is transferred to the battery 1022 of the energy storage robot 100 from the charging pile 204, facilitating subsequent use.

In other embodiments of the present disclosure, since the energy storage system includes the energy storage robot 100 according to any one of the above technical solutions, the energy storage system has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile 202 may correspondingly have a range capable of performing electricity storage, i.e., the electricity storage position. When the energy storage robot 100 moves to the electricity storage position, the electricity can be transferred by the energy storage robot 100 to the electricity storage pile, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system 200 includes the energy storage robot 100 according to any one of the above embodiments, the energy storage system 200 has any one of the technical effects of the solution of the energy storage robots 100 as described above, and details are omitted herein.

According to the energy storage robot and the energy storage system provided by the present disclosure, charging interfaces of different specifications can be replaced at any time as required, thereby improving the use safety.

Some embodiments according to the present disclosure are described below with reference to FIG. 1 to FIG. 5 and FIG. 17.

As illustrated in FIG. 1, the energy storage robot 100 provided by the embodiment mainly includes the base 102, the support 106, and the sensor 110. The battery 1022 disposed in base 102 serves as an energy storage component, and the moving device 104 is disposed at the base 102. The base 102 can be driven to move under the action of the moving device 104, so that the mobile power supply within the predetermined region range is achieved. It can be understood that in the outdoor scene, the power demand at different places exists at different time points. At this time, the battery 1022 is driven by the moving device 104 to move to different positions, which greatly improves the use convenience degree of the user and improves the usage experience of the user. In addition, the detachably connected support 106 is further disposed at the base 102. By providing the solar panel 108 at the support 106, in the case where outdoor sunlight is strong and power generation efficiency is high, the energy of the battery 1022 can be supplemented through the solar panel 108, thereby ensuring longer-time use. In this solution, the at least one of the base 102 and the support 106 is further provided with the sensor 110 in their structure, which can obtain and determine the surrounding environment and the corresponding movement range of the energy storage robot 100. In this way, the movement control of the base 102, the movement control of the solar panel 108, and even the detection of weather conditions can be realized, thereby greatly improving the intelligence of the energy storage robot 100 during use. The energy storage robot 100 can be used as the ideal tool during user's actual use, to improve the user's usage experience.

In the solution, in a power generation state, the solar panel rotates to be folded and opened through structures like a hinge; and in a non-power generation state, rotation and stacked arrangement is implemented through a hinge or other manners. In some embodiments, when charging is not required, the solar panel is stacked and stored, which saves the space and keeps the appearance clean and tidy. When the mains supply is unavailable, the solar panel may provide charging for the battery, to lower a number of cycle use of the battery, prolonging a service life of the battery. According to the charging demand of the battery and a solar illumination condition, the expanded state and storage state of the solar panel can be flexibly controlled, improving the charging efficiency.

It needs to be emphasized that, in the solution, the solar panel 108 located at the support 106 is movable and has different states. In the first state, the light receiving area of the plurality of solar panels 108 is small, which belongs to the storage state. Moreover, there is only one solar panel 108 or no solar panel 108 to receive the light for charging the battery 1022. In the second state, the light receiving area of the plurality of solar panels 108 is large, which belongs to the expanded state. At this time, the solar panel is applied to the scene where the sunlight is strong and high power is required for charging the battery 1022.

In a specific embodiment, as illustrated in FIG. 5, a plurality of hinges 144 at different heights are used for connecting the solar panel to the base. Since the heights of the hinges 144 are different, in the storage state, the plurality of solar panels are laminated to each other, to save the space, making the entire device look cleaner. An axis of the hinge is unparallel to an upper surface of the base, such that in the storage state, the plurality of solar panels are stacked and stored, thereby reducing the occupation of space.

For the plurality of hinges 144, by providing a plurality of coaxial hinges 144 and a plurality of parallel hinges 144 are provided, it can be realized that, in the storage state, the plurality of coaxial hinges 144 and the plurality of parallel hinges 144 are laminated to each other, i.e., different solar panels rotate in different planes, which simplifies the structure of the entire system and reduces manufacturing and maintenance costs. In addition, the plurality of hinges 144 with axes parallel to each other can maintain the stability of the solar panel in the expanded state, reduce shaking caused by external factors such as wind, and improve the charging efficiency.

In the above technical solution, the moving device includes a track and/or a universal wheel.

It can be understood that the connection between the solar panel 108 and the battery 1022 is the electrical connection. In some embodiments, a charging controller needs to be used for the connection between the solar panel 108 and the battery 1022. During the specific connection, the positive electrode and the negative electrode of the solar panel 108 need to be connected to the positive electrode and the negative electrode of the charging controller, respectively. Then, the positive electrode and the negative electrode of the battery 1022 are connected to the positive electrode and the negative electrode of the charging controller, respectively.

Further, the energy storage robot 100 can move as a whole. Moreover, the position of the support 106 relative to the base 102 is adjustable. In this way, the angle of the solar panel 108 is changeable. In addition, the portability and the power generation efficiency are balanced, and the photoelectric conversion efficiency is improved.

Further, the connection between the support 106 and the base 102 is the detachable connection, and specifically includes, but is not limited to, a magnetic connection, a snap connection, and the like, as long as the connection between the two are facilitated.

The moving device 104 may only be a vehicle wheel, and drives the base 102 to move through the external force, or the vehicle wheel is provided with a driving wheel of the motor, and the base 102 may be directly driven by the driving wheel to move.

In one embodiment, the moving device 104 may employ a single-track structure.

In another embodiment, the moving device 104 employs a single universal wheel structure.

In another embodiment, a track and a universal wheel may be provided simultaneously at the base 102.

The track structure has strong adaptability, can adapt to various terrains, including muddy terrain, rugged terrain, uneven terrain, and the like, has strong load capacity, can bear a heavy weight, has strong a traction force. The track has a stronger traction force than wheels, can travel on the steeper slope, is more stable, has a greater ground area than wheels, and can provide more stable driving.

In addition, the rolling friction of the universal wheel is smaller than that of the track, so that the wheels can provide a faster speed and are more flexible, and can perform turn and turn-around more easily.

In actual use, the track and the universal wheel can be flexibly selected according to a specific use scene of the energy storage robot 100. For example, in the outdoor scene applied to the mountain land, the single-track structure can be used. In the outdoor scene applied to the flat square, the universal wheel structure can be used.

Further, as illustrated in FIG. 2, the storage box 112 is provided at the support 106, which can provide the predetermined storage space for the plurality of solar panels 108, allowing the plurality of solar panels 108 in the storage state to be stored in the storage box 112. Therefore, the storage space of the solar panel 108 is greatly reduced, and the portability is improved. In the expanded state, the plurality of solar panels 108 extends out of the storage box 112, such that the corresponding light receiving area of the plurality of solar panels 108 is increased, improving the power generation efficiency.

Further, one solar panel 108 is provided at the top of the storage box 112, i.e., at the side of the storage box 112 away from the base 102. In the case where the plurality of solar panels 108 is stored in the storage box 112, low-power continuous charging can still be performed by using the solar panel 108 located at the top side of the storage box 112.

The storage box 112 may be fixed at the support 106, or may be movably connected to the support 106.

Since the volume of the energy storage robot 100 relative to the sun is too small, and the distance between the sun and the energy storage robot 100 is too far, in the case where light emitted by the sun faces towards the plurality of solar panels 108 in the expanded state, the angles between the solar panels 108 and the sunlight are the same by limiting the plurality of solar panels 108 to be parallel to each other. The plurality of solar panels 108 is utilized to effectively improve the point-transmitting efficiency. Moreover, when the angle of the solar panel 108 is adjusted, the solar panels 108 can be adjusted together, thereby simplifying the operation.

It should be noted that, since the plurality of solar panels 108 is parallel to each other, in the case where one solar panel 108 is provided at the top of the storage box 112, the plurality of solar panels 108 is parallel to the top surface of the storage box 112.

In an embodiment, by limiting the rotating of the connection between the support 106 and the base 102, the angle of the support 106 can be effectively adjusted, enabling the solar panel 108 to generate power at high power generation efficiency by adjusting its posture within the rotation range.

Further, the rotation range between the support 106 and the base 102 is limited. In some embodiments, it is limited that the support 106, no matter how it rotates relative to the base 102, has the angle smaller than 60° from the horizontal plane, thereby achieving a better power generation effect.

In an embodiment, the pull rod structure 114 is provided at the base 102, which is convenient for the user to self-move the energy storage robot 100, with a more labor-saving operation. In some embodiments, the pull rod structure 114 is provided at the front side of the base 102, and the user pulls the base 102 through the pull rod structure 114; or the pull rod structure 114 is provided at the rear side of the base 102, and the user can push the base 102 forwards through the pull rod structure 114.

Further, the pull rod structure 114 is a retractable structure, can extend when the user needs, and is convenient for the user to push and pull. When the user does not need to move the base 102, the pull rod structure 114 can be retracted to reduce its occupied space.

Further, the power supply panel 116 is provided at the base 102, so that the charging state and the output voltage of the battery 1022 can be displayed on the power supply panel 116. Meanwhile, the power supply interface 1162 can be utilized on the power supply panel 116 to provide the electric quantity to the outer space for the use of the power supply device.

It can be understood that in general power consumption scenarios, the user's electric device has non-uniform interface types. Therefore, the power supply panel 116 is provided with various kinds of power supply interfaces 1162 of different specifications, i.e., the power supply interfaces 1162 in different interface types, to facilitate the use by the user.

Further, the interface type includes, but is not limited to, a national standard interface, an alternating current interface, a direct current interface, interfaces with different voltages, a USB direct plug interface, and the like.

On the basis of any of the above embodiments, as illustrated in FIG. 3, for the solar panel 108, the solar panel 108 mainly includes the plate support 1082 and the photovoltaic panel 1084. The plate support 1082 is disposed at the support 106 and is fixedly connected to or movably connected to the support 106. The plate support 1082 can play a role in protecting the photovoltaic panel 1084 by providing the photovoltaic panel 1084 in the plate support 1082, thereby preventing the photovoltaic panel 1084 from being damaged during the installation or use.

It needs to be supplemented that when the photovoltaic panel 1084 is mounted, the surface of the photovoltaic panel 1084 receiving the light is located at the top side of the photovoltaic panel 1084, i.e., the light receiving surface is located away from the base 102, thereby facilitating the conversion of solar energy.

As illustrated in FIG. 5, the embodiment provides an energy storage system 200, mainly including a charging pile 204 and the energy storage robot 100. The charging pile may correspondingly have a chargeable range, i.e., the charging position. The charging pile charges the energy storage robot 100 in response to the energy storage robot 100 moving to the charging position. At this time, the current is transferred to the battery 1022 of the energy storage robot 100 from the charging pile 204, facilitating subsequent use.

In other embodiments of the present disclosure, since the energy storage system 200 includes the energy storage robot 100 according to any one of the above technical solutions, the energy storage system 200 has any one of the technical effects of the solution of the energy storage robot 100 as described above, and details are omitted herein.

In another embodiment, as illustrated in FIG. 4, there is also provided an energy storage system 200, including an electricity storage pile 202 and the energy storage robot 100. The electricity storage pile may correspondingly have a range capable of performing electricity storage, i.e., the electricity storage position. When the energy storage robot 100 moves to the electricity storage position, the electricity can be transferred by the energy storage robot 100 to the electricity storage pile, and then is finally transferred into the energy storage device 206 through the connection between the electricity storage pile 202 and the energy storage device 206, so as to facilitate the use of household electric device.

In one scene, the energy storage robot 100 may be continuously charged in the daytime. The energy storage robot 100 may automatically move to the electricity storage position for charging the energy storage device 206 after its built-in battery 1022 is fully charged, and then go to the outdoor to absorb solar energy for charging.

In other embodiments of the present disclosure, since the energy storage system includes the energy storage robot 100 according to any one of the above embodiments, the energy storage system has any one of the technical effects of the solution of the energy storage robots 100 as described above, and details are omitted herein.

According to the energy storage robot and the energy storage system provided by the present disclosure, the solar panel can move relative to the base. When power generation is needed, the solar panel is expanded outwards, which balances the charging efficiency and storage space, and facilitates carrying and transportation.

In the present disclosure, the terms "first", "second", "third", etc., are merely for description, and cannot be understood as indicating or implying relative importance. It should be understood that "a plurality of" referred to herein means two or more, unless specified otherwise. Terms such as "installation", "connection", "connected to", "fixed" and the like should be understood in a broad sense. For example, "connection" may be a fixed connection or a detachable connection or an integral connection; "connected to" may be directly or indirectly connected through an intermediate. For those of ordinary skill in the art, the specific meaning of the above-mentioned terms in the present disclosure can be understood according to specific circumstances.

In the description of the present disclosure, it should be understood that, orientations or position relationships indicted by terms such as "upper", "lower", "left", "right" "front", "back", and the like, are based on orientations or position relationships shown in the accompanying drawings, and is merely for the convenience of describing the present disclosure and simplifying the description, rather than indicating or implying that the associated device or element must have a specific orientation, or be constructed and operated in a specific orientation, and therefore cannot be understood as a limitation on the present disclosure.

In the description of this specification, descriptions with reference to the terms "an embodiment", "some embodiments", "specific embodiments", or the like, mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

While preferred embodiments of the present disclosure have been described above, the present disclosure is not limited thereto. For those skilled in the art, various changes and modifications can be made to the present disclosure. Any modification, equivalent replacement, improvement, etc., made within the spirit and principle of the present disclosure shall fall within the scope of the present disclosure.

What is claimed is:

1. An energy storage system, comprising:
at least one electric pile device, each of the at least one electric pile device having a first charging port defined thereon; and
an energy storage robot comprising:
a base provided with a battery therein and a moving device at a bottom of the base, the moving device being configured to drive the base to move relative to the ground;
a support detachably connected to the base, the support being provided with a plurality of solar panels electrically connected to the battery, a light receiving area of the plurality of solar panels in a first state being smaller than a light receiving area of the plurality of solar panels in a second state;
a second charging port movably connected to the base, a height of the second charging port relative to the base being adjustable;
a plurality of sensors disposed at the base and/or the support and configured to detect a movement range and/or environmental information of the base; and
a controller disposed at the at least one electric pile device and/or the energy storage robot, the controller being configured to control, in response to the base moving into a charging range of the at least one electric pile device, the second charging port to lift and lower to allow the second charging port to be connected to the first charging port.

2. The energy storage system according to claim 1, wherein:
a height of the first charging port on the at least one electric pile device is adjustable; and
the controller is configured to adjust the height of the first charging port to allow the first charging port to be connected to the second charging port.

3. The energy storage system according to claim 1, wherein the plurality of sensors comprises a laser sensor, the laser sensor being configured to receive, in response to the base moving to the charging range of the at least one electric pile device, light information reflected by the at least one electric pile device, and configured to control, according to the light information, the second charging port to lift and lower.

4. The energy storage system according to claim 1, wherein the plurality of sensors comprises a Hall sensor, the Hall sensor being configured to receive, in response to the base moving to the charging range of the at least one electric pile device, magnetic field information corresponding to the at least one electric pile device, and configured to control, according to the magnetic field information, the second charging port to lift and lower.

5. The energy storage system according to claim 1, wherein:
the controller is configured to, in response to a connection of the second charging port to the first charging port, control the at least one electric pile device to charge the energy storage robot; or
the controller is configured to, in response to a connection of the second charging port to the first charging port, control the energy storage robot to transport electricity to the energy storage device through the at least one electric pile device.

6. The energy storage system according to claim 1, further comprising a storage box disposed at the support, a solar panel of the plurality of solar panels being disposed at a side of the storage box away from the base, wherein:

in the first state, the rest of the plurality of solar panels are stacked and stored in the storage box; and in the second state, the rest of the plurality of solar panels extend out of the storage box.

7. The energy storage system according to claim 1, further comprising a timing device electrically connected to the controller and configured to obtain a peak power period and a valley period of a mains supply, wherein:

the controller is configured to supply, in the peak power period, power to the electric device connected to the mains supply by using the battery; or the controller is configured to charge, in the valley power period, the battery of the energy storage robot by using the mains supply.

8. The energy storage system according to claim 1, further comprising a power supply panel disposed at the base and having a plurality of power supply interfaces of different interface types.

* * * * *